United States Patent
Ditaranto et al.

(10) Patent No.: US 11,636,563 B1
(45) Date of Patent: Apr. 25, 2023

(54) CENTRALIZED SCHEDULING FOR DELIVERIES VIA VEHICLES

(71) Applicant: Amazon Technologies, Inc., Seattle, WA (US)

(72) Inventors: Nicole Marie Ditaranto, Seattle, WA (US); Nicholas Hebb, Seattle, WA (US); Manish Jyoti, Edmonds, WA (US); Sumit Kumar Sharma, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 84 days.

(21) Appl. No.: 16/702,035

(22) Filed: Dec. 3, 2019

(51) Int. Cl.
*G06Q 50/28* (2012.01)
*G06Q 10/06* (2012.01)
*G06Q 10/10* (2012.01)
*G06Q 10/0631* (2023.01)
*G06Q 10/1093* (2023.01)

(52) U.S. Cl.
CPC ..... *G06Q 50/28* (2013.01); *G06Q 10/063116* (2013.01); *G06Q 10/1097* (2013.01)

(58) Field of Classification Search
None
See application file for complete search history.

(56) References Cited

U.S. PATENT DOCUMENTS

| | | | | |
|---|---|---|---|---|
| 5,880,958 | A * | 3/1999 | Helms | G08G 1/202 701/117 |
| 10,108,922 | B2 * | 10/2018 | Godfrey | G01S 19/13 |
| 10,282,694 | B2 * | 5/2019 | Jones | G06Q 10/0835 |
| 10,679,311 | B2 * | 6/2020 | Mohr | G01C 21/3407 |
| 11,100,451 | B2 * | 8/2021 | Haque | G06Q 40/08 |
| 2004/0230601 | A1 * | 11/2004 | Joao | G06Q 10/08 |
| 2006/0200008 | A1 * | 9/2006 | Moore-Ede | B60K 28/06 600/300 |
| 2010/0250446 | A1 | 9/2010 | Mackenzie et al. | |
| 2016/0104111 | A1 * | 4/2016 | Jones | G06Q 10/0835 705/26.4 |
| 2016/0117638 | A1 | 4/2016 | DiSorbo | |
| 2016/0300186 | A1 | 10/2016 | Scharaswak et al. | |
| 2017/0270476 | A1 * | 9/2017 | Cotte | G06Q 50/28 |
| 2018/0046964 | A1 | 2/2018 | Leoni et al. | |

(Continued)

OTHER PUBLICATIONS

Office Action for U.S. Appl. No. 16/702,079, dated Sep. 28, 2021, Sharma, "Load Assignment for Deliveries Via Vehicles", 15 pages.

(Continued)

*Primary Examiner* — Folashade Anderson
(74) *Attorney, Agent, or Firm* — Lee & Hayes, P.C.

(57) ABSTRACT

A central system, or server, may store information for determining the schedules of drivers. For example, the information may include loads assigned to the drivers, training, lunch breaks, time off, and/or other commitments. The central system may centrally store the information to efficiently and conveniently determine and update schedules. The central system may allow drivers and/or carriers to manage driver onboarding, training, compliance, scheduling, work assignment, and reporting, as well as build monthly, weekly, and daily schedules. The central system may also automate matching drivers to loads, balances work distribution, reduce human errors, and assist in audits.

20 Claims, 13 Drawing Sheets

(56) References Cited

U.S. PATENT DOCUMENTS

| | | | |
|---|---|---|---|
| 2018/0052462 A1* | 2/2018 | Arena | G06Q 50/30 |
| 2018/0053149 A1* | 2/2018 | Sarrapy | G06Q 10/06314 |
| 2018/0349849 A1 | 12/2018 | Jones et al. | |
| 2020/0307610 A1* | 10/2020 | Lerner | H04L 9/3236 |
| 2020/0334987 A1* | 10/2020 | Shoval | G06Q 50/30 |
| 2020/0349496 A1* | 11/2020 | Irwin | G06Q 10/083 |
| 2020/0394609 A1* | 12/2020 | Fan | G06Q 10/0834 |

OTHER PUBLICATIONS

Office Action for U.S. Appl. No. 16/702,079, dated Jan. 12, 2022, Sharma, "Load Assignment for Deliveries Via Vehicles", 23 pages.
Office Action for U.S. Appl. No. 16/702,035, dated Nov. 29, 2021, Ditaranto, "Centralized Scheduling for Deliveries Via Vehicles", 16 pages.

* cited by examiner

CENTRALIZED SCHEDULING FOR DELIVERIES VIA VEHICLES

BACKGROUND

The development of e-commerce has brought about an increase in order fulfillment, distribution, and shipping. To handle and manage shipments, carrier dispatchers coordinate the assignment and scheduling of drivers to loads or shipments for delivery. Conventionally, dispatchers manually piece together eligibility and availability when assigning driver(s) to shipments. For example, dispatcher often use spreadsheets, email chains, and manual reports to manage driver information, track compliance, and build driver schedules. The manual process may lead to a reduced capacity utilization, and/or missed work opportunities. As carriers grow and expand, however, the manual dispatch process becomes increasingly inefficient and difficult to scale. Moreover, dispatchers often lack visibility into driver endorsements and qualifications, a permissible number of workable hours remaining, or driver preferences. The lack of a centralized platform may lead to inconsistent driver assignment decisions and increased driver turnover.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
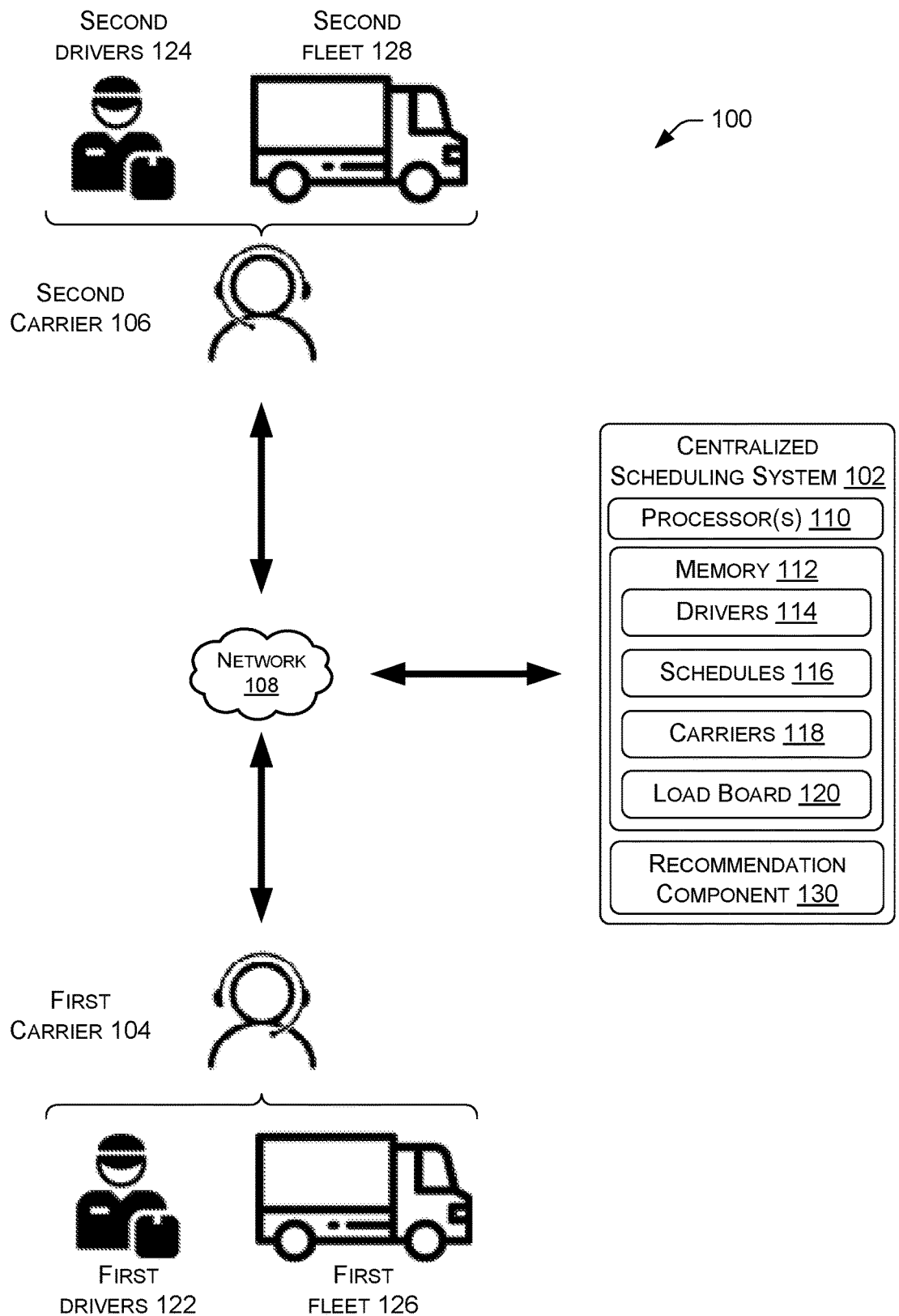
FIG. 1 illustrates an example environment for determining loads and assigning drivers to the loads based on schedules of the drivers, according to an embodiment of the present disclosure. A centralized scheduling system may maintain a list of available loads and the loads may be recommended to drivers for assignment.

Discussed herein are systems and methods for determining schedules of drivers and assigning shipments, or loads, to the drivers. In some instances, the systems and methods discussed herein may generate driver schedules based on known information about the driver, such as availability, qualifications, and/or preferences. Through knowing the schedules of the drivers, as loads become available, the systems and methods may determine suitable or recommended loads for the drivers. In some instances, these loads may be transmitted to a dispatcher of the carrier for acceptance or approval. If accepted, the load may be assigned to the driver and the schedule associated with the driver may be updated. Such centralized scheduling and management may allow for increased productivity, consistent driver assignment, and the time-sensitive nature of assigning and tracking loads. Additionally, centralizing the scheduling and assignment of loads may ensure that drivers are qualified to deliver certain loads. As a result, carriers may efficiently scale to handle increased loads, reassign loads between drivers (e.g., unassigning loads, disassociating loads and drivers, removing loads for driver schedules, etc.), and/or monitor a performance or availability of drivers.

The systems and methods herein may determine schedules for drivers utilizing various information. For example, a centralized scheduling system may track and record currently assigned loads for drivers. These assigned loads may be populated within a calendar to understand available time slots or openings in which drivers may have availability to accept loads. Utilizing these available openings, the centralized scheduling system may determine whether the drivers are available to accept loads. In some instances, the centralized scheduling system may automatically populate the schedules with mandatory periods of rest or breaks. For example, drivers are often limited to a permissible number of hours each day and/or week they may drive. The centralized scheduling system may provide visibility into a schedule of a driver and the available openings of the drivers to accept loads.

As shipments or orders are fulfilled or readied by retailers, distribution centers, or other facilities packaging or handling shipments, loads associated with the order may be created. The loads may, in this sense, correspond to a shipment of the order between locations or from one location to another. These loads are often made available to outside partners, third-parties, or carriers. For example, as an order is fulfilled by a retailer, the retailer may partner or contract with a third-party to handle the shipment of the order. The shipment of orders are often handled in bulk, or loads, between distribution centers or other induction sites whereby packages are sorted and shipped to their final destination. In some instances, the retailer may upload or post the loads for acceptance by carriers. Oftentimes, the carriers scan these loads to determine loads that are acceptable or which may be handled. For example, a dispatcher of the carrier may determine available drivers to handle the loads.

The dispatcher, or carrier, often utilizes information about the load and/or the drivers when accepting or determining compatible loads. For example, the dispatcher may determine a route associated with the load, whether the driver is qualified to deliver the load, whether the driver has the availability to accept the load, and/or whether the driver is legally permitted to deliver the load based on a permitted number of working hours. To aid in this decision, the dispatcher may utilize schedules of the driver to determine their availability. Additionally, the dispatcher may confirm certifications or endorsements of the driver. Such process, however, is often tedious given the cross-referencing between multiple sources of information or databases and often leads to inconsistent and/or improper driver assignments. To alleviate these deficiencies and streamline the time-sensitive nature of scheduling and assigning loads, the centralized scheduling system may include components that automatically match drivers with compatible loads.

For example, as loads are posted to the load board the centralized scheduling system may identify suitable or acceptable loads for the driver. These loads may be presented to the dispatcher, or the driver, for acceptance, modification, or rejection. In some instances, the loads may be presented as recommended loads. The dispatcher may have a predetermined amount time to accept, modify, or reject the load. Otherwise, the centralized scheduling system may provide the load to another carrier and/or another driver. However, as the centralized scheduling system has insight into the schedule of the driver, qualifications of the driver, preferences of the driver, and the availability of the driver, the loads presented to the driver may be compatible and acceptable to the driver. That is, the centralized scheduling system may reduce an amount of time when determining available drivers for loads and the loads presented to the drivers may already be compatible with the drivers. In some instances, the loads recommended to the driver may be automatically accepted and/or populated within the schedule of the driver. After the load is assigned to the driver, the load board may be updated to remove the load from the available loads.

The centralized scheduling system may determine loads for multiple drivers and across different carriers. That is, while the above example is with regard to scheduling a single load for a certain driver, the centralized scheduling system may schedule multiple loads, in parallel, for drivers. The centralized scheduling system may maintain, for each carrier and for each driver, schedules and information associated with determining and assigning loads. Storing this information in a centralized location allows for the real-time matching of loads to drivers and the assignment of loads to particular drivers as well as the updating of available loads on the load board. For example, knowing that a first driver is unavailable to accept a first load allows the centralized scheduling system to determine a second driver capable of delivering the load. Given the time-sensitive nature of load assignment, the centralized scheduling system may therefore efficiently and conveniently assign loads to drivers.

From time to time the driver and/or the dispatcher may update the schedule of the driver. For example, the driver may take personal time off or the carrier may schedule training for the driver. In such instances, the schedule of the driver may be updated for use by the centralized scheduling system when determining and assigning loads to the driver. Additionally, or alternatively, the driver may update preferences, for example, days of the week the driver prefers to deliver loads or a duration of time it takes to deliver loads (e.g., the amount of time scheduled to deliver the load). These, and other criteria, may alter the loads recommended to the driver for acceptance.

The centralized scheduling system may also monitor the progress of loads for use in reassigning loads. For example, a first driver may be assigned to deliver a first load and thereafter may be assigned to deliver a second load. Tracking a progress of the first load may allow the centralized scheduling system to determine whether the first driver will be able to pick up and/or deliver the second load on time. For example, the centralized scheduling system may receive an indication that the first driver is late in delivering the first load, and therefore, may be unable to pick up the second load on time. To prevent delay of the second load, the centralized scheduling system may determine a second driver capable of delivering the second load. The centralized scheduling system may therein transmit the second load to the second driver (or a carrier associated therewith) for acceptance. If accepted, the second load may be reassigned from the first driver to the second driver and the schedules of the first driver and the second driver may be respectively updated. Such reassignment may ensure that loads are delivered on time.

The centralized scheduling system may present user interfaces on a device operated or carried by the driver. The device may present user interfaces to allow the driver to view his or her schedule, make modifications to the schedule, and/or view loads. The device may also track, or record, information associated with the driver, such as a number of driving hours, loads delivered, training, and so forth. Additionally, or alternatively, the centralized scheduling system may present user interfaces on a device of the dispatcher. The dispatcher may utilize the user interfaces to manage and view the schedules for the drivers of the carrier. Additionally, through the user interfaces, the dispatcher may update schedules of the users and/or modify other information associated with scheduling and assigning loads, such as updating training appointments, qualifications, driver preferences, and so forth.

In light of the above, the centralized scheduling system and the systems and/or methods herein allow dispatchers to build schedules, plan for breaks, and schedule non-driving responsibilities such as training, yard work, and manager meetings. Such process may alleviate the hassle and burden of carriers scheduling, managing, and assigning loads and instead provide carriers with technological tools to manage operations and administration to increase operational efficiency. For example, the centralized scheduling system may present a convenient interface for dispatchers to manage driver onboarding, training, compliance, scheduling, work assignment, and reporting, as well as build monthly, weekly, and daily schedules for drivers. Meanwhile, the centralized scheduling system may scale to accommodate increased deliveries or loads by the drivers and/or the carriers. The centralized scheduling system allows for a centralized platform that automates matching drivers to loads, balances work distribution, reduces human errors, and increases efficiency. For example, the automatic assignment of load to the drivers may reduce an amount of communication between platforms, databases, and/or computing resources.

Centralizing the information may also reduce an amount of time to schedule and assign loads. For example, storing the information in a centralized database may reduce an amount of time to determine compatible drivers for loads or assign loads to drivers. That is, instead of communicating between databases and/or computing resources of disparate sources, for example, centralizing the information may reduce the time to process information to select a driver for a load. Compared to conventional systems that may communicate and await responses, the centralized scheduling system may maintain information to determine driver eligibility and automatically assign the loads to the drivers, thereby reducing an amount of time it takes to determine an availability of the driver and confirm loads. Such process also reduces the use of computing resources, or the communication between computing resources, to either confirm and assign the loads. Moreover, as the centralized scheduling system stores and retains information of past loads and driver records, the centralized scheduling system may prevent de-activated, low-rated, and/or non-compliant drivers being assigned loads. The centralized storage of information also ensures a consistent source of information when scheduling drivers and assigning loads. Such information may also be used in audits, training, qualification status, and ongoing compliance of regulatory requirements ensuring employee safety and reducing risk.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates an example environment 100 for assigning loads, or deliveries, to driver(s) based at least in part on schedules of the drivers. As shown, the environment 100 may include a centralized scheduling system 102, a first carrier 104, and a second carrier 106. In some instances, the first carrier 104 and the second carrier 106 may include dispatchers that operate or control computing devices in communication with the centralized scheduling system 102. For example, a first dispatcher of the first carrier 104 and a second dispatcher of the second carrier 106 may operate computing devices, respectively, that are in communication over a network 108 with the centralized scheduling system 102 via wired technologies (e.g., wires, USB, fiber optic cable, etc.), wireless technologies (e.g., RF, cellular, satellite, Bluetooth, etc.), or other connection technologies.

The network 108 is representative of any type of communication network, including data and/or voice network, and may be implemented using wired infrastructure (e.g., cable, CAT5, fiber optic cable, etc.), a wireless infrastructure (e.g., RF, cellular, microwave, satellite, Bluetooth, etc.), and/or other connection technologies. The centralized scheduling system 102, the first carrier 104 (or a computing device thereof), the second carrier 106 (or a computing device thereof) may connect to the network 108 using one or more network interfaces, respectively. Additionally, although FIG. 1 illustrates two carriers (or dispatchers) connecting to the centralized scheduling system 102, more than two carriers (or two devices) may be in communication with the centralized scheduling system 102.

The centralized scheduling system 102 may determine drivers for delivering loads (e.g., packages, letters, crates, palettes, custom-cargo, gaylords, box-trailers, flatbed trailers, etc.) between delivery centers, distribution centers, handling facilities, processing facilities, inducting facilities, etc. For example, loads may be shipped from a distribution center to a handling facility where the loads are unloaded and/or sorted for delivery (e.g., residential houses, commercial buildings, etc.). As loads are created or readied for shipment, the centralized scheduling system 102 may determine drivers capable or available to deliver the loads. Therein, the centralized scheduling system 102 may assignment and manage the delivery of the loads. For example, as shown, the centralized scheduling system 102 may include processor(s) 110 and memory 112 storing or having access to various databases and/or information. The processor(s) 110 may perform one or more processes and/or functions associated with determining drivers to deliver loads and managing the delivery of the loads.

The memory 112 may include information associated with drivers 114, schedules 116, carriers 118, and a load board 120. The drivers 114 may store various information associated with drivers. For example, the first carrier 104 may include first drivers 122 for delivering loads while the second carrier 106 may include second drivers 124 for delivering loads. In this sense, the carriers 118 may represent corporates or companies that employ or maintain drivers 114 for delivering loads. The drivers 114 also store additional information such as identifying information of the drivers 114 including names, addresses, contact information, and so forth.

The schedules 116 may include schedules of the drivers 114, such as their assigned loads, personal time off, vacations, training, break(s), non-driving responsibilities (e.g., meetings), periods of leave (e.g., personal time off, etc.), and so forth. The schedules 116 may include breakdowns of daily, weekly, monthly, and/or yearly schedules, as well as minute-by-minute or hour-by-hour scheduling. As discussed herein, the centralized scheduling system 102 may determine or update the schedules 116 of the drivers 114 as loads are assigned and completed, as well as other events that are scheduled.

The memory 112 may also store or otherwise have access to the load board 120, which may represent available loads, or deliveries, to be scheduled and/or assigned to the drivers 114. For example, as shipments are readied for delivery, a load associated with the shipment may be uploaded or posted to the load board 120. In some instances, the load board 120 may include any number of loads to be delivered and/or assigned. Additionally, the load board may include information associated with the loads, such as a place of origin, a destination, a type of load (e.g., crates, palette, custom shipment, one-way load, two-way load, etc.), a type of vehicle or tractor-trailer (e.g., box truck, flatbed, semi-trailer, etc.), weight, contents (e.g., hazardous materials, oversized load, packages, etc.), delivery date, budget, and so forth. In some instances, loads within the load board 120 may be generated and/or populated by shippers (or carriers) or retailers. For example, as retailers fulfill or create loads for shipment, the retailer may post freight and load requirements to the load board 120.

In addition to maintaining information about the drivers 114, the memory 112 may also store information associated with the carriers 118 who deliver loads, or who are utilized to deliver loads posted to the load board 120. The carriers 118 may identify drivers (e.g., the first drivers 122 and the second drivers 124) of the carriers 118 as well as information about delivery vehicles or a fleet of the carriers 118. For example, the first carrier 104 may maintain a first fleet 126 for delivering loads and the second carrier 106 may maintain a second fleet 128 for delivering loads.

A recommendation component 130 of the centralized scheduling system 102 may determine recommended loads among the load board 120 for assigning to the drivers 114. For example, the recommendation component 130 may compare the schedule 116 of the drivers 114 with the available loads on the load board 120 to determine load(s) for drivers 114. That is, by analyzing the schedules 116 of the drivers 114, the loads on the load board 120, as well as the capacity and/or capabilities of the carriers 118, the recommendation component 130 may match loads on the load board 120 with the drivers 114 and flag or otherwise identify these loads as recommended loads. As discussed herein, the recommendation component 130 may also utilize qualifications and/or other information of the driver when recommending load(s).

After determining the recommended loads, the centralized scheduling system 102 may transmit an indication of the recommended loads. For example, the recommended loads may be transmitted, respectively, to the first carrier 104 and the second carrier 106. Upon receipt, the first carrier 104 and the second carrier 106 may choose to accept, deny, or modify the recommended load(s) 220 for their respective drivers (e.g., the first drivers 114 and the second drivers 114). If the load is accepted, the first carrier 104 and the second carrier 106 may transmit an indication to the centralized scheduling system 102. Therein, the centralized scheduling system 102 may assign the load to a driver among the drivers 114. The centralized scheduling system 102 may also remove the load from the load board 120 and/or update the schedules 116 of the drivers 114, respectively. Assigning the load to the driver may be used to update a schedule of the driver or recommend additional loads on the load board 120 to the drivers 114. Additionally, upon being accepted, the recommended load may be stored as a load amongst loads of the carrier 118.

Alternatively, the first carrier 104 and the second carrier 106 may, in some instances, reject or deny the recommended loads. For example, upon receiving the recommended loads, the first carrier 104 and the second carrier 106 may check the schedules of the drivers 114. If drivers are unavailable to perform the load, the first carrier 104 and the second carrier 106 may transmit an indication of such to the centralized scheduling system 102. In turn, the centralized scheduling system 102 may determine another driver amongst the drivers 114. For example, the recommendation component 130 may determine another driver, whether among another carrier or the same certain, to transmit the recommended load. Additionally, or alternatively, the first carrier 104 or the second carrier 106 may, in some instances, modify or edit the recommended loads. For example, the first carrier 104 and the second carrier 106 may modify a shipment or delivery date of the recommended load. In such instances, the first carrier 104 and the second carrier 106 may transmit, to the centralized scheduling system 102, an indication of the edit or modification for approval. Upon receipt, the centralized scheduling system 102 may determine whether the modifications are acceptable.

In some instances, however, the recommended loads may be automatically accepted for the drivers 114, without approval and/or acceptance from the first carrier 104 and the second carrier 106. As the centralized scheduling system 102 has access to the schedules 116 of the drivers 114, for instance, the centralized scheduling system 102 may know which load(s) the drivers 114 may accept or have the ability to perform. In such instances, the centralized scheduling system 102 may have up-to-date information for use in scheduling or assigning the loads to the drivers 114. Here, rather than the centralized scheduling system 102 transmitting the loads as recommended loads, the centralized scheduling system 102 may automatically assign the loads to the drivers and then transmit or notify the first carrier 104 and the second carrier 106 of the assigned loads.

Although FIG. 1 illustrates a scenario for scheduling loads to drivers, in some instances, the techniques herein may find use in automated deliveries and/or mechanism. For example, automated machines such as robots, automated vehicles, unmanned aerial vehicles (UAVs), and so forth may be assigned loads for delivering. In such instances, the loads may be assigned to the automated machines for delivery and a centralized system may manage the deliveries or control the automated machines to deliver their respective loads.

Figure 2:
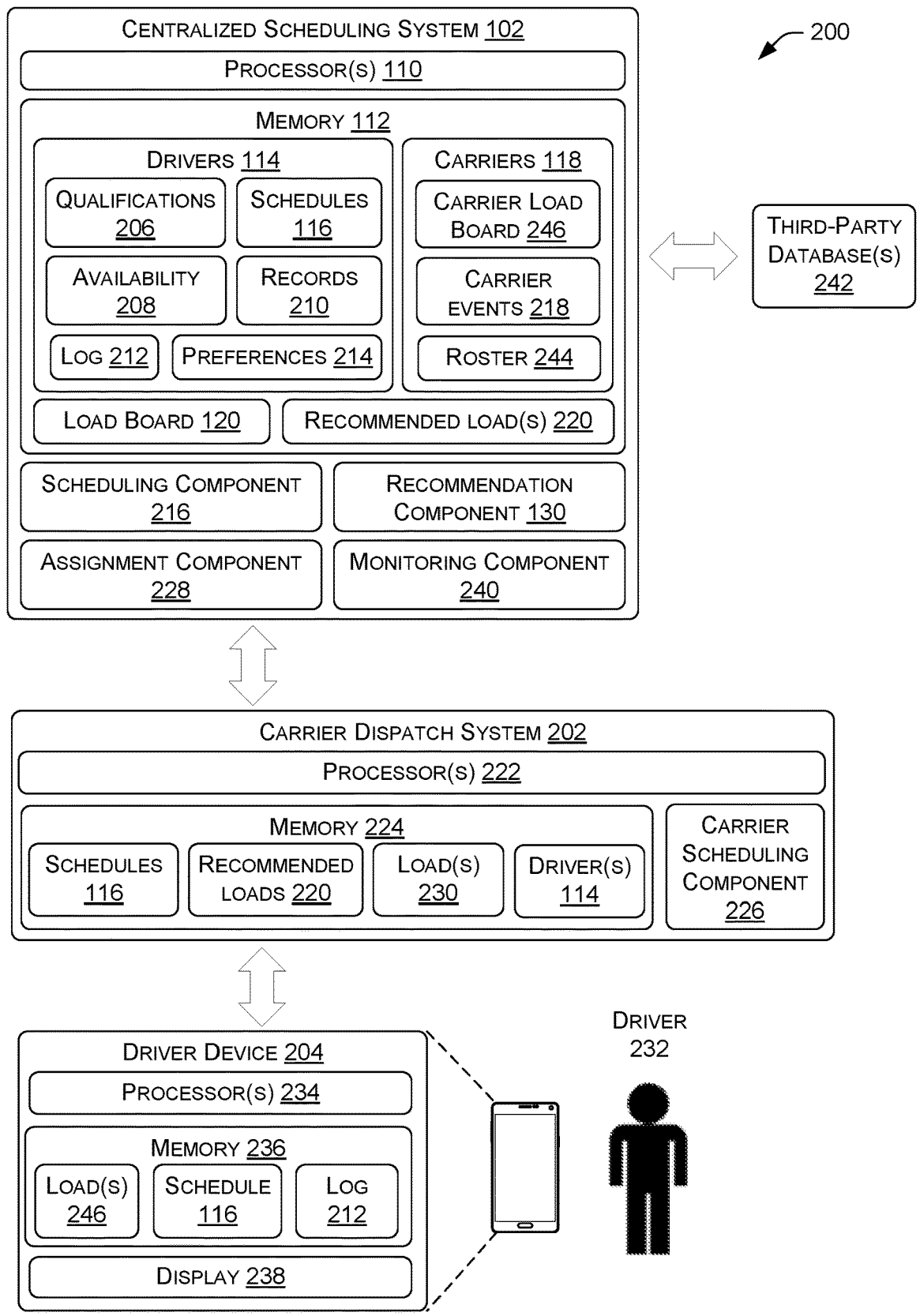
FIG. 2 illustrates an example environment for generating schedules for drivers and assigning loads, or shipments, to drivers based on one or more criteria, according to an embodiment of the present disclosure. In some examples, a centralized scheduling system may determine, using the one or more criteria, recommended or compatible loads for the drivers. The recommended or compatible loads may be presented to a dispatcher of a carrier for acceptance and assignment to the drivers.

FIG. 2 illustrates an example environment 200 for managing deliveries and assigning loads, or deliveries, to driver(s). As shown, the environment 200 may include the centralized scheduling system 102, a carrier dispatch system 202, and a driver device 204. In some instances, the centralized scheduling system 102, the carrier dispatch system 202, and the driver device 204 may be in communication, for example, over the network 108 to transmit and receive data. In some instances, the centralized scheduled system 102, the carrier dispatch system 202 and/or the driver device 204 may be in communication, or exchange information, via a mobile application, portal, website, and so forth.

Discussed above, the centralized scheduling system 102 may determine drivers for delivering loads and as loads are created or readied for shipment. To determine and recommend loads, the memory 112 may store various information associated with the drivers 114. In some instances, maintaining information about the drivers 114 in a central location, or storing the information associated with the drivers in a central location may limit a need to onboard or maintain multiple databases in distinct locations. Instead, the centralized scheduling system 102 may assemble information across disparate sources to efficiently and conveniently store information for determining schedules and assigning loads. For example, as shown in FIG. 2, the drivers 114 may include the schedules 116, qualifications 206, availability 208, records 210, a log 212, and preferences 214. Discussed above, the schedules 116 may include schedules of the drivers 114, such as their assigned loads, personal time off, vacations, training, break(s), non-driving responsibilities, and so forth.

The qualifications 206 may include qualifications and certifications of the drivers 114, as well as endorsements (e.g., whether the drivers 114 may haul hazardous materials, hazmat materials, oversized loads, etc.), performance reviews (from an employer or supervisor), physical examinations, road tests, and/or licenses. The qualifications 206 may be utilized to ensure that the drivers 114 are compliant and/or otherwise permitted to deliver loads and/or certain types of loads. Additionally, or alternatively, the qualifications 206 may include types or a class of vehicles the drivers 114 are permitted to driver (e.g., Class A, Class B, Class C, etc.), a permitted number of miles the drivers 114 may legally drive (e.g., miles permitted per trip/load, total hours of service (HoS) per day, total HoS per week, etc.), and whether the drivers 114 may operate a vehicle lone alone or under the supervision of a supervisory. The qualifications 206, however, may also store other various information to assist in determining whether the drivers 114 are qualified to deliver certain loads and/or operate certain vehicles.

The availability 208 of the drivers 114 may include times and/or dates when the drivers 114 are available and/or unavailable for delivering loads. In some instances, the availability 208 may be determined utilizing the schedules 116 and/or the qualifications 206 of the drivers 114. For example, depending on the qualifications 206 of the drivers 114, the drivers 114 may be permitted to only deliver loads under a certain weight, length, and/or during certain times of the day/week. Discussed herein, the availability 208 may be utilized when scheduling or assigning loads to the drivers 114 and the availability 208 may be constantly updated based on the loads that are delivered, reassigned, or canceled. As such, updating and knowing the availability 208 of the drivers 114 allows the centralized scheduling system 102 to determine if and when the drivers 114 are available to accept additional loads.

The records 210 may include a record of the drivers 114, such as violations (e.g., tickets, etc.), timeliness of delivering loads (e.g., on-time, late, etc.), acceptance rate of loads (e.g., acceptance of recommended load), performance ratings, and so forth.

The log 212 may include a number of hours the drivers 114 have driven, a current amount of time the drivers 114 have been driving, previous loads of the drivers 114 (e.g., completed, reassigned, and/or information associated with the previous loads, such as length, origin, destination, etc.), loads that are in progress and/or currently assigned to the drivers 114, and so forth. In some instances, the log 212 may continuously update as the drivers 114 deliver loads. For example, the log 212 may constantly update (e.g., in seconds, minutes, hours, etc.) to determine the availability 208 of the drivers 114. The availability 208 of the drivers 114 may impact if and/or which loads are recommended to the drivers 114 and/or whether the drivers 114 are capable (e.g., based on the availability 208) to accept loads. In this sense, the log 212 may be used by the centralized scheduling system 102 to track the drivers 114, such as by tracking a current location of the drivers 114, which may indicate whether a driver 114 has deviated from an assigned or recommended route. Additionally, the drivers 114 may interact with the log 212 using the driver device 204.

The preferences 214 may include preferences of the drivers 114, such as locations, area, geographic areas (e.g., regions, State(s), routes, etc.) the drivers 114 prefer to deliver to travel between, the types of vehicles the drivers 114 prefer to drive, the types of loads the drivers 114 prefer to deliver, days of the week the driver 114 prefers to work, hours the driver 114 prefers to work, and so forth. In some instances, the preferences 214 of the drivers 114 may be used when determining the schedules 116 and/or the availability 208 the drivers 114. Moreover, as discussed herein, the preferences 214 may be used to assign loads to the drivers 114.

In addition to maintaining information about the drivers 114, the memory 112 may also store information associated with the carriers 118 who deliver loads. For example, certain carriers may be assigned or scheduled for regularly scheduled loads (e.g., daily, weekly, hourly, monthly, etc.). In some instances, these regularly scheduled loads may be uploaded or posted on a carrier load board 246. The carrier load board 246 may represent loads that are not uploaded or posted to the load board 120, but rather, are uploaded and/or posted onto a load board for a specific carrier. This specific carrier, for example, may routinely deliver certain loads or may be under contract for delivering certain loads, and when a load is generated by the centralized scheduling system 102, the carrier-specific load may automatically be posted to the carrier load board 246. Additionally, carrier events 218, such as carrier-specific regulations (e.g., working hours, breaks, break lengths, training, etc.) may be stored in association with the carriers 118. Furthermore, a roster 244 of the carriers 118 may identify drivers (e.g., the drivers 114) of the carriers 118, or which the carriers 118 the drivers 114 are assigned.

The load board 120 may represent available loads, or deliveries, to be scheduled and/or assigned to the drivers 114. In some instances, the load board 120 may include any number of loads to be delivered and/or assigned.

The centralized scheduling system 102 may include various modules, engines, or components for determining schedules of the drivers 114 and assigning loads to the drivers 114. The components, for example, may analyze the drivers 114, the carriers 118, and/or the load board 120 to determine qualified and/or available drivers for delivering loads. Therein, the centralized scheduling system 102 may assign the loads to drivers 114, respectively, and update the schedules 116 of the drivers 114. In some instances, the processes performed by the centralized scheduling system 102, or the components thereof, may automate the time-sensitive scheduling and assignment of loads.

To illustrate, the centralized scheduling system 102 may include a scheduling component 216 that determines the schedules 116 of the drivers 114. For example, as the drivers 114 (or dispatchers) update their preferences 214, personal time off, and so forth, the schedules 116 of the drivers 114 may fluctuate and the scheduling component 216 may determine or update the schedules 116. The schedules 116 may also reflect the loads assigned to the drivers 114. The scheduling component 216 may also populate the schedules 116 with mandatory breaks (e.g., meals and rest breaks as required by law), training, and/or carrier events 218 (e.g., training, meetings, work-related functions, and so forth).

Discussed above, in some instances, utilizing the schedules 116 and/or the availability 208 of the drivers 114, the recommendation component 130 may determine recommended load(s) 220 among the load board 120 for recommending to the drivers 114. For example, the recommendation component 130 may compare the schedules 116 of the drivers 114 with available loads on the load board 120 to determine the recommended load(s) 220. The recommended load(s) 220 may also be determined by factoring in the qualifications 206, the preferences 214, and/or other information associated with the drivers 114 and/or the loads on the load board 120. For example, a driver may prefer to deliver loads between Portland, Oreg. and Seattle, Wash. on Thursdays. Using these preferences, for example, the recommendation component 130 may analyze and match loads on the load board 120. However, noted above, the recommendation component 130 may also utilize the qualifications 206 and/or other information to determine, or confirm, that the driver is qualified to deliver the loads.

After determining the recommended load(s) 220, the centralized scheduling system 102 may transmit an indication of the recommended load(s) 220 to the carrier dispatch system 202 associated with a carrier. In some instances, and as shown in FIG. 2, the carrier dispatch system 202 may include a computing device or system external or separate from the centralized scheduling system 102. The carrier dispatch system 202 may receive the recommended load(s)

220 from the centralized scheduling system 102, and upon receipt, may choose to accept, deny, or modify the recommended load(s) 220 on behalf of the driver. In some instances, the carrier dispatch system 202 may be operated by the dispatcher which schedules and accepts loads from the centralized scheduling system 102. In this sense, although the centralized scheduling system 102 may recommend a load for a driver, the carrier dispatch system 202 may function to act as a gatekeeper to which recommended load(s) 220 are accepted for the drivers 114.

The carrier dispatch system 202 may include processor(s) 222 and memory 224. The memory 224 may store or otherwise have access to the schedules 116 of the drivers 114 and the recommended load(s) 220 as determined by the centralized scheduling system 102. The carrier dispatch system 202 may also include a carrier scheduling component 226 that schedules loads for the drivers 114 and/or determines the schedules 116 for the drivers 114. For example, the recommended load(s) 220 received from the centralized scheduling system 102 may include identifying information of a driver for the recommended load and/or identifying information of the recommended load (e.g., origin, destination, etc.). The carrier, or the carrier dispatch system 202, may utilize the information associated with the recommended load(s) 220 to determine whether the carrier, or the driver, has the capacity or availability to accept the load. If so, the carrier scheduling component 226 may accept the recommended load and populate the load within the schedule of the driver (e.g., time, dates, etc.). In some instances, upon accepting the load, the carrier dispatch system 202 may transmit an indication to the centralized scheduling system 102 notifying of the acceptance of the load. Therein, the centralized scheduling system 102 may assign the load to the driver 114 via an assignment component 228. The centralized scheduling system 102 may also remove the load from the load board 120 and/or update the schedule 116 of the driver.

The carrier dispatch system may maintain a list of loads 230 assigned to the drivers 114 of the carrier. In this sense, the dispatcher or the carrier may centrally manage the drivers 114, the loads 230 assigned to the drivers 114, and the schedules 116 of the drivers 114.

Assigning the load to the driver 114 may be used to update a schedule of the driver 114 or recommend additional loads on the load board 120 to the drivers 114. For example, the scheduling component 216 of the centralized scheduling system 102 may determine that upon the load being assigned to the driver 114, the driver 114 is no longer available during a certain period of time (e.g., the availability 208) or does not have time remaining to accept additional loads (e.g., based on driver regulations and/or HoS the driver 114 is permitted to drive). Therein, the recommendation component 130 may use the updated schedule to know that the driver 114 is no longer available during that particular time frame and may not recommend other loads to the driver 114 during the period of time. Upon being accepted, the recommended load(s) 220 may be stored as the loads 230 amongst loads of the carrier 118. The load 230, or an indication thereof, may be transmitted from the centralized scheduling system 102 and/or the carrier dispatch system 202 to the driver device 204 associated with a driver 232.

As illustrated, the driver device 204 include processor(s) 234 and memory 236 storing, or otherwise having access to load(s) 246 that are assigned to the driver 232, the schedule 116, and the log 212. The driver 232 may utilize the driver device 204 to view their assigned loads (e.g., those loads recommended by the centralized scheduling system 102, those loads 246 accepted by the carrier dispatch system 202, etc.). Additionally, the loads 246 assigned or scheduled to the driver 232 may be selected, accepted, and/or chosen by the driver 232 using the driver device 204.

The driver device 204 may record information associated with the loads 246 and/or the loads delivered by the driver 232 within the log 212. For example, the driver 232 may enter driving hours, break times, and/or mark loads as completed. The driver device 204 may further include the schedule 116, which the driver 232 may access to view or determine their schedule for delivering loads and/or other non-driving responsibilities (e.g., training). Furthermore, the driver device 204 may include a display 238 for presenting the schedule 116 and/or user interfaces for entering information into the log 212 and/or viewing information of the loads 246. The driver device 204 may also present maps for routing the driver 232 along a route associated with delivering the loads 246. Along the route, the driver device 204 may track a location of the driver 232 for updating the amount of time the driver 232 is driving, delivering loads, determining a progress of the load, or notifying the driver 232 when to take scheduled breaks.

Alternatively, the carrier dispatch system 202 may, in some instances, reject or deny the recommended load(s) 220. For example, upon receiving the recommended load(s) 220, the carrier dispatch system 202 or personnel operating the carrier dispatch system 202 may check the available or schedule of the driver 114. If the driver 114 is unavailable to perform the load, the carrier dispatch system 202 may transmit an indication of such to the centralized scheduling system 102. In turn, the centralized scheduling system 102 may determine another driver amongst the drivers 114. For example, the recommendation component 130 may determine another driver, whether among another carrier or the same certain, to transmit the recommended load(s) 220.

Additionally, or alternatively, the carrier dispatch system 202 may, in some instances, modify or edit the recommended load(s) 220. For example, the carrier dispatch system 202 may modify a shipment or delivery date of the recommended load(s) 220. In such instances, the carrier dispatch system 202 may transmit, to the centralized scheduling system 102, an indication of the edit or modification for approval. Upon receipt, the centralized scheduling system 102 may determine whether the modifications are acceptable.

In some instances, however, the recommended load(s) 220 may be automatically accepted for the drivers 114, without approval and/or acceptance from the carrier dispatch system 202. For example, as the centralized scheduling system 102 has access to the schedules 116 and qualifications 206 of the drivers 114, the centralized scheduling system 102 may know which load(s) the drivers 114 may accept or have the ability to perform. The centralized scheduling system 102 may have up-to-date information to use in scheduling or assigning the loads to the drivers 114. Rather than the centralized scheduling system 102 transmitting the loads as recommended load(s) 220, the centralized scheduling system 102 may automatically assign the loads to the drivers 114 and then transmit or notify the carrier dispatch system 202 of the assigned loads to the drivers 114.

Furthermore, although the carrier dispatch system 202 is shown illustrating certain components, the carrier dispatch system 202 may include or have access to any of the components and/or information described above with regard to the centralized scheduling system 102. For example, the carrier dispatch system 202 may have access to the carriers 118 to update and/or modify the carrier events 218.

The centralized scheduling system 102 may also include a monitoring component 240 that monitors or tracks the loads. For example, after a load is assigned and/or is en route to a destination, the monitoring component 240 may track a progress of the load. In some instances, the monitoring component 240 may determine whether the load will be delivered on time (e.g., late or early). For example, the monitoring component 240 (or the centralized scheduling system 102) may track (e.g., global positioning system (GPS)) or receive indications associated with a location of a vehicle operated by the driver 232. Additionally, the monitoring component 240 may receive indications associated with parcels of the load (or the load itself) being scanned at handling facilities. Such indications or tracking may be used by the monitoring component 240 to determine whether the loads are (or will be) delivered on time, early, late, or within a certain window. Based on the monitoring by the monitoring component 240, the availability 208 may be updated to reflect the time the drivers 114 are available. For example, if the drivers 114 deliver a load early, the availability 208 may be updated for use in assigning and/or determining additional loads for the drivers. If the drivers 114 deliver the loads late, the availability 208 may be updated for use in assigning, canceling (e.g., if the drivers 114 do not have remaining HoS), or determining loads. As such, the monitoring component 240 may track or monitor a progress of the drivers 114 delivering the loads for use in updating the schedules 116 and the availability 208.

In some instances, whether the load will be delivered on time may impact additional loads assigned and/or to be delivered by the driver 114, or may be used to assign one or more additional loads to the driver 114. For example, a first driver may be assigned a first load for delivery from a first location to a second location and then a second load for delivery from the second location (or another location) to a third location. The first driver may, for example, be scheduled to drop off the first load at the second location and then pick up the second load for delivery to the third location. However, in delivering the first load, the monitoring component 240 may determine that the first driver will arrive late at the second location. For example, the monitoring component 240 may receive a geographical location of the vehicle operated by the driver 232. The late arrival of the first driver may impact a timeliness with which the second load is delivered to the third location. In some instances, upon determining that the first driver will be late (or outside a certain threshold time), the centralized scheduling system 102 may reassign the second load to a second driver. For example, the centralized scheduling system 102 may use previous results of the recommendation component 130 to determine the second driver for delivering the second load. Alternatively, the recommendation component 130 may determine the second driver for delivering the second load through analyzing the drivers 114. In such instances, the centralized scheduling system 102 may reupload or repost the second load to the load board 120 for use by the recommendation component 130 and assignment by the assignment component 228. Regardless, the recommendation component 130 may determine the second driver and transmit a recommended load to the second driver, upon which the second driver may accept or deny the recommended load. In some instances, this process may repeat until the second load is accepted by a driver. Therein, the second load may be reassigned from the first driver to the second driver.

Alternatively, the monitoring component 240 may determine that the first driver will arrive early to the second location and may assign one or more additional loads (or tasks) to the first driver before a time in which the first driver is to pick up the second load. For example, if the first driver arrives two hours early, the recommendation component 130 may recommend additional loads for completion by the first driver. Herein, the first driver may accept and complete these additional loads before picking up the second loads.

FIG. 2 further illustrates that the centralized scheduling system 102 may in communication with or operably connected to one or more third-party database(s) 242. In some instances, the third-party database(s) 242 may store or have access to information stored in the memory 112 of the centralized scheduling system 102. For example, the one or more third-party database(s) 242 may include information associated with the roster 244 of the carriers 118 and/or the load board 120. Here, in some instances, the centralized scheduling system 102 may access the one or more third-party database(s) 242 for determining the schedules 116 and/or the recommended load(s) 220, for example. For instance, an application program interface (API) of the centralized scheduling system 102 may be access information stored in one or more of the third-party database(s) 242.

In some instances, the centralized scheduling system 102 may include components to calculate performance scores of the drivers 114 and/or the carriers 118. The performance scores may be based on an on-time delivery of the loads and/or the acceptance rate of the recommended load(s) 220. For example, if drivers routinely or over a threshold frequency (or time) deliver loads late, a performance score of the driver may be reduced. Additionally, if the centralized scheduling system 102 recommends loads to the carrier dispatch system 202, but the dispatcher rejects the loads, the performance score of the driver and/or the carrier may be reduced. Reducing the performance score may impact assigning or recommending loads to the driver and/or the carrier in future instances. For example, in determining which driver and/or carrier to recommend a load, the centralized scheduling system 102 may determine the acceptance rate and/or on-time delivery.

As noted above, centralizing the information associated with the drivers 114 may permit efficient storage of resources when scheduling and assigning loads. Centralizing the information may also reduce inaccuracies in schedules and assignments. For example, having a central source of information may eliminate disparate sources including different or contradictory information. In this sense, the centralized scheduling system 102 may represent a single source of information for the drivers 114. In some instances, the information stored for the drivers 114 may be utilized when performing audits (e.g., the Department of Transportation). For example, the information stored in association with the drivers 114 may be used to determine driving history, whether the drivers 114 are up-to-date in their training, and so forth.

As used herein, a processor, such as processor(s) 110, the processor(s) 222, and/or the processor(s) 234 may include multiple processors and/or a processor having multiple cores. Further, the processor(s) may comprise one or more cores of different types. For example, the processor(s) may include application processor units, graphic processing units, and so forth. In one implementation, the processor(s) may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) may possess its own local memory, which also may store program components, program data, and/or one or more operating systems.

The memory 112, the memory 224, and/or the memory 236 may include volatile and nonvolatile memory, removable and non-removable media implemented in any method or technology for storage of information, such as computer-readable instructions, data structures, program component, or other data. Such memory may include, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

FIGS. 3-7 illustrate various processes for determining schedules of drivers and assigning loads to the drivers. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1 and 2, although the processes may be implemented in a wide variety of other environments, architectures, and systems.

Figure 3:
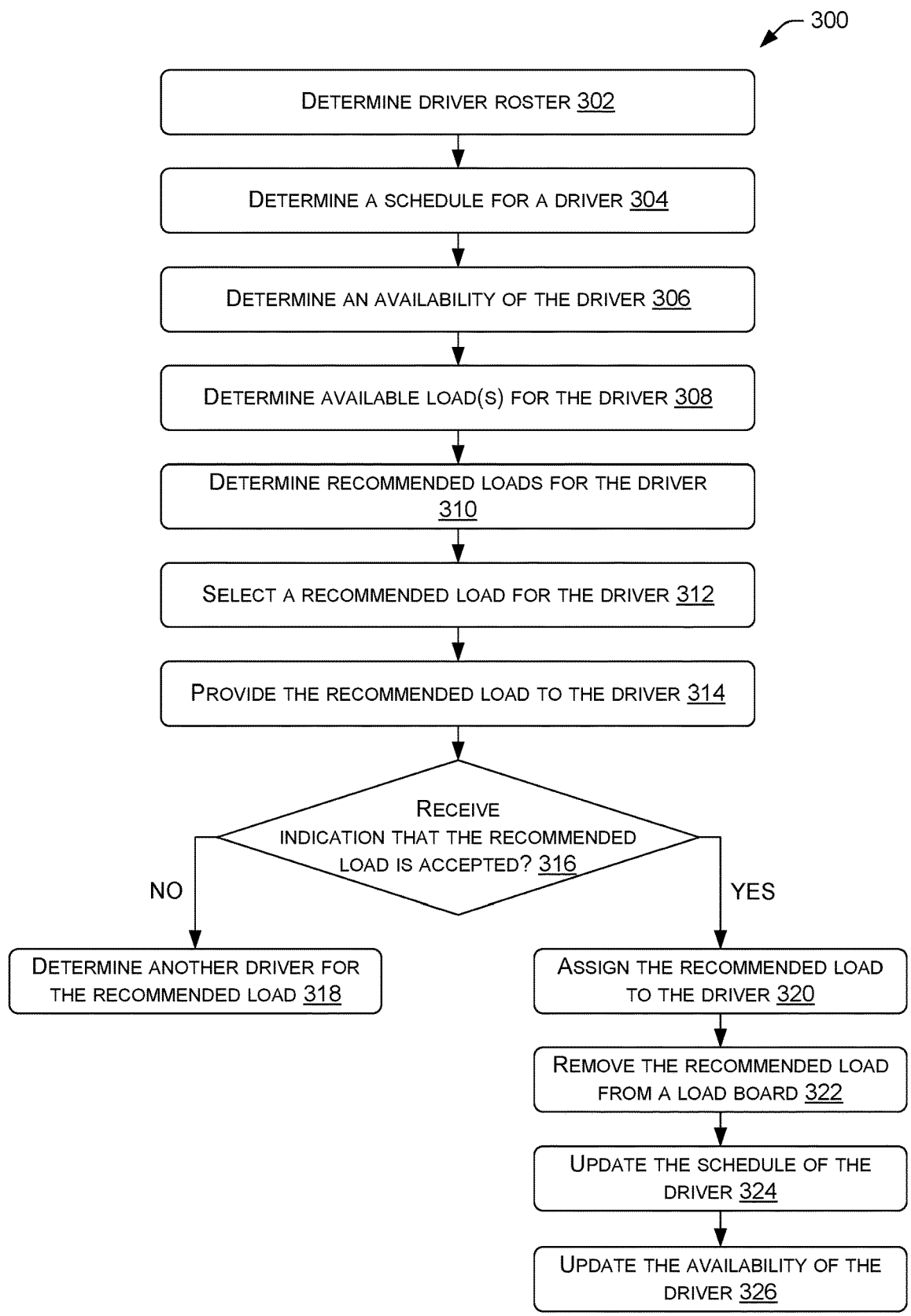
FIG. 3 illustrates an example process for determining schedules of drivers and providing recommended loads to drivers, according to an embodiment of the present disclosure.

FIG. 3 illustrates an example process 300 for recommending loads to drivers. In some instances, the process 300 may be performed by the centralized scheduling system 102.

At 302, the process 300 may determine a driver roster. For example, for a carrier amongst carriers 116 stored in a database of the centralized scheduling system 102, the centralized scheduling system 102 may determine a driver roster or drivers of the carrier.

At 304, the process 300 may determine a schedule for a driver of the carrier. For example, for each of the drivers of the driver roster, the centralized scheduling system 102 may determine a schedule. In some instances, determining the schedule may involve, or based at least in part on, loads, carrier-specific loads, break(s), vacation(s), training, or other periods of leave. Loads may include previously-scheduled loads that a driver is scheduled to deliver. For example, the schedule may include a calendar breakdown of the loads the driver is scheduled to deliver and days of the week, as well as the times, the driver is to deliver the loads. These loads may be populated into the schedule of the driver. Carrier-loads may correspond to regularly-scheduled loads the driver is assigned to deliver. For example, each week at a particular time, a driver may be scheduled for a certain load. As these loads may be forecasted into the future, loads may be assigned based on the availability of the driver outside of the carrier-specific loads. Breaks may include mandated breaks per a certain number of house of service (HoS) per day. For example, carriers may offer thirty-minute break and an additional fifteen-minute break for every additional four consecutive hours worked. Certain regulations and/or laws may also mandate certain breaks. For example, a driver may have may a trip scheduled between Seattle, Wash. and Boise, Id. The centralized scheduling system 102 may determine that this load is scheduled to take seven hours and may automatically schedule breaks during the trip. The centralized scheduling system 102 may schedule a thirty-minute break at which the driver is to rest and/or have lunch after four hours of driving, or at four hours into the load. Additionally, the vacations of the driver may include scheduled vacations (e.g., personal time off) and the training may include mandated and/or regularly scheduled training for the drivers. Accordingly, utilizing these and other factors (e.g., manager meetings, vehicle maintenance, etc.), the centralized scheduling system 102 may determine schedules for the drivers.

After determining the schedule, the centralized scheduling system 102 may transmit the schedule to the driver. In addition to transmitting the schedule, the centralized scheduling system 102 may transmit metadata associated with the driver that serves to notify the driver of their respective entries in the schedule (e.g., loads, training, breaks, etc.). For example, a device displaying the schedule may notify the driver in real-time of their upcoming loads, assigned breaks, training, and so forth.

At 306, the process 300 may determine an availability of the driver. For example, based at least in part on the schedule, the centralized scheduling system 102 may determine an availability of the driver. The centralized scheduling system 102 may determine openings or an availability of the driver to accept loads. That is, knowing the schedule of the driver allows the centralized scheduling system 102 to determine the availability or capacity of the driver to accept loads. In some instances, determining the availability may include determining a HoS per day and/or a HoS per week the driver is permitted to drive. For example, drivers may be limited to an amount of workable time per day and/or per week. Here, despite the driver having an opening in his or her schedule, a HoS per day and/or a HoS per week may limit loads being assigned and/or scheduled to the driver.

At 308, the process 300 may determine available load(s) for the driver. For example, based at least in part on the availability of the driver, the schedule of the drivers, and loads to be assigned, the centralized scheduling system 102 may determine available load(s) for the driver. In some instances, the available load(s) may include those loads, yet to be assigned, that fit within the schedule of the driver and which the driver is available to accept.

At 310, the process 300 may determine recommended loads for the driver. In some instances, determining the recommended loads may involve driver record(s), driver qualification(s), and/or driver preference(s). In some instances, not all loads available to the driver may be suitable or acceptable for the driver. Here, for example, a record of the driver may limit the load being assigned or recommended to the driver. The driver record(s) may indicate whether the driver delivers loads on-time, within a certain threshold of time, and/or an experience level of the driver. The qualifications may also limit loads the drivers may accept. For example, certain classes of delivery vehicles and/or certain loads may limit those loads acceptable by a driver. Drivers may not have the correct endorsements (e.g., trailer lengths, tractor types, materials of the load such as hazmat, etc.) and/or qualifications to handle certain loads. Additionally, driver preference(s) may include preferences of the driver for certain loads or loads the driver has accepted or been assigned in the past. For example, driver preference(s) may include locations the driver prefers to travel between, days of the week the driver prefers to drive, times of the day the driver prefers to drive, types of loads the driver prefers to deliver, and/or types of vehicles the driver prefers to drive. These, and other factors, may limit which loads are recommended to the driver. For example, among the available loads, not all of the loads may be preferred by the driver and/or the driver may not be qualified to deliver certain loads. That is, despite the user having the availability and/or time with their schedule for delivering the loads, other factors may impact recommending the load to the driver.

At 312, the process 300 may select a recommended load for the driver. For example, the centralized scheduling system 102, among the recommend loads, may select a recommended load to the driver. The recommended load may represent a load that is compatible with the schedule of the driver and which the driver is qualified to deliver, for instance.

At 314, the process 300 may transmit the recommended load to the driver and/or a dispatcher associated with the driver. For example, after determining the recommended load, the centralized scheduling system 102 may transmit an indication of the recommended load to a device of the driver and/or a device of the dispatcher. In some instances, the device of the driver and/or the dispatcher may display the recommended load. For example, the device may display details of the load for the driver to make an informed decision about accepting the load (e.g., time, dates, location, etc.).

At 316, the process 300 may determine whether an indication is received associated with the driver accepting the recommended load. For example, the centralized scheduling system 102 may determine whether an indication is received associated with the recommended load being accepted. If at 316, the process 300 determines that the indication was not received, the process 300 may follow the "NO" route and proceed to 318 whereby the process 300 may determine another driver to recommend the load. For example, using the operations 302-308, the process 300 may determine another driver available and capable to deliver the load.

However, in some instances, as the recommended load is determined to already be compatible with the driver (e.g., operation 310), if the driver and/or the dispatcher rejects the load a performance rating of the driver and/or the carrier may be effected. For example, if a driver rejects the recommended load, the centralized scheduling system 102 may reduce a performance rating of the driver. The performance rating may impact the recommendation of loads in future instances.

Alternatively, if at 316 the process 300 receives an indication that the recommended load is accepted by the driver, the process 300 may follow the "YES" route and continue to 320. At 320, the process 300 may assign the recommended load to the driver. For example, the centralized scheduling system 102 may assign the recommended load to the driver. In some instances, the centralized scheduling system 102 may await a predetermined amount of time to receive the notification of the acceptance. For instance, if the centralized scheduling system 102 does not receive the acceptance within the predetermined amount of time, the centralized scheduling system 102 may automatically determine another driver (e.g., the second driver) for recommending and/or accepting the load, as discussed above At 322, the process 300 may remove the load from a load board. For example, the centralized scheduling system 102 may remove the load from the load board based at least in part on the recommended load being accepted by the driver. By removing the recommended load from the load board, the recommended load may not be accepted or assigned to other drivers.

At 324, the process 300 may update the schedule of the first driver. For example, the centralized scheduling system 102 may schedule the load within the schedule of the driver. Accordingly, in future instances, the centralized scheduling system 102 may utilize the updated schedule to determine future loads for the driver.

At 326, the process 300 may update the availability of the first driver. For example, the centralized scheduling system 102 may determine the availability (e.g., the availability 208) of the first driver based on assigning the recommended load to the first driver. In some instances, the centralized scheduling system 102 may determine characteristics of the recommended load (e.g., duration, length, etc.) and/or the updated schedule of the first driver for use in determining the availability. For example, depending on a duration of the recommended load (e.g., days, hours, etc.), the first driver may be unable to accept additional loads within certain period or timeframe given driver regulations or a permissible number of hours drivers are allowed to drive (e.g., HoS). Accordingly, as the first driver accepts loads, the availability of the driver may be updated for use in determining future loads.

FIG. 3 and the process 300 illustrate a scenario whereby the centralized scheduling system 102 may automate the process for dispatching drivers to facilitate real-time, data driven, and efficient driver assignments. The centralized scheduling system 102 may manage and coordinate the scheduling of loads across carriers and drivers. Through centrally managing and coordinating the scheduling of loads via the centralized scheduling system 102, an amount of communications across networks may be reduced and bandwidth may be increased. That is, conventionally, carriers or drivers may manage schedules across multiple platforms, each of which may store respective data associated with scheduling loads and driver assignments. These platforms, however, are not integrated with one another and may store inconsistent information. As such, their use often leads to inconsistent driver assignment and a poor utilization of computing resources. Instead, maintaining a single source of information, within a centralized system, may reduce such deficiencies and reduce not only memory requirements across multiple platforms, but may lead to an overall reduction in network traffic. Through this, in some instances, centralizing the storage of information as well as centralizing processing to determine driver schedules and driver and load assignments may lead to a reduction in network communication. Additionally, latencies associated with scheduling or confirming driver assignments and/or load assignments may be reduced. Furthermore, although FIG. 3 and the process 300 illustrate and discuss determining a single recommended load for a single driver, the process 300 may determine more than one recommended load for a single driver and/or may determine more than one recommended load for more than one driver. For example, the centralized scheduling system 102 may determine, for multiple drivers, recommended loads using the process 300.

Figure 4:
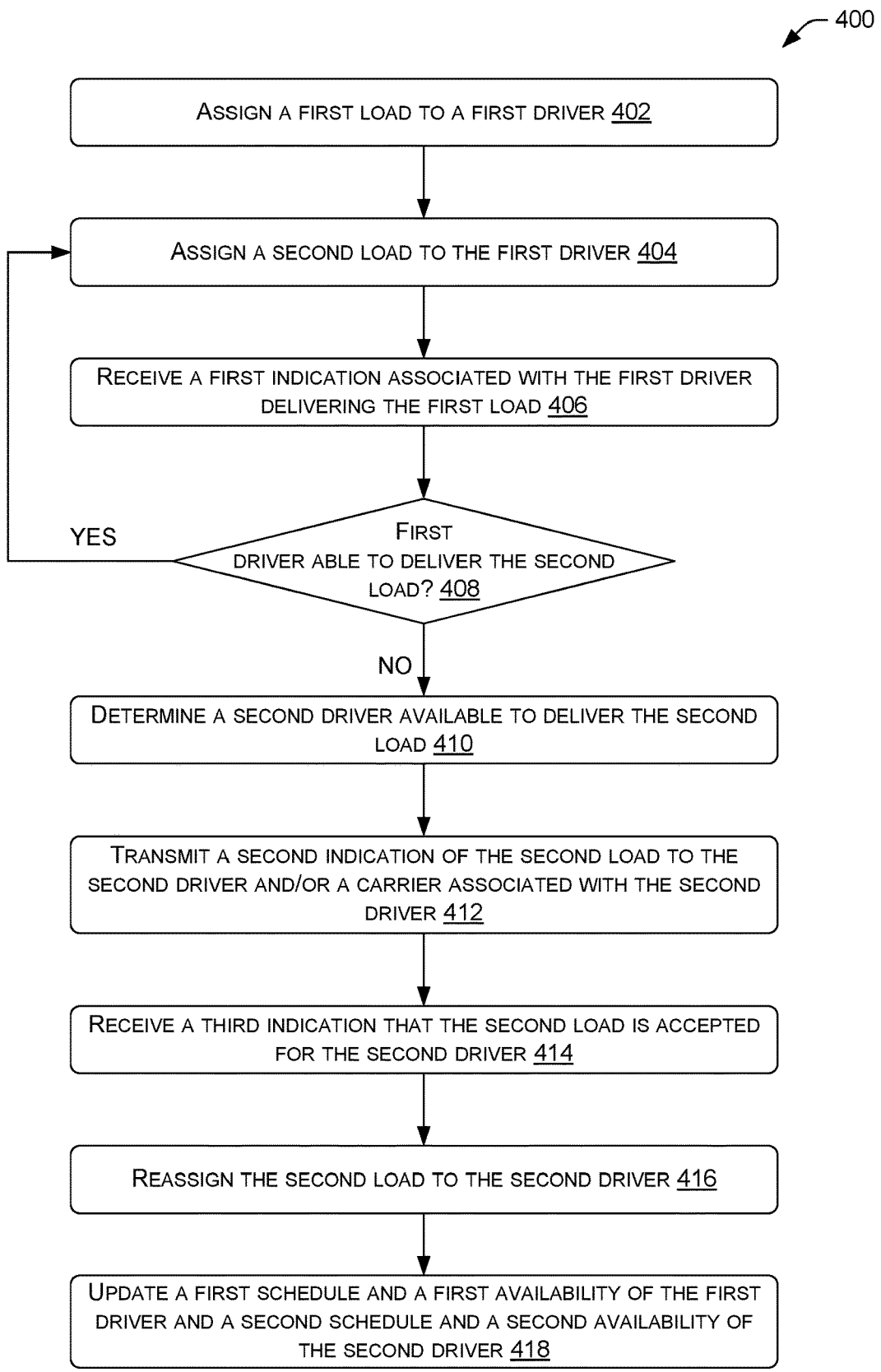
FIG. 4 illustrates an example process for reassigning a load from a first driver to a second driver, according to an embodiment of the present disclosure.

FIG. 4 illustrates an example process 400 for reassigning a load from a first driver to a second driver. In some instances, the process 400 may be performed by the centralized scheduling system 102.

At 402, the process 400 may assign a first load to a first driver. For example, the centralized scheduling system 102 may assign a first load on a load board to a first driver.

At 404, the process 400 may assign a second load to the first driver. For example, the centralized scheduling system 102 may assign a second load on the load board to the first driver.

At 406, the process 400 may receive a first indication associated with the first driver delivering the first load. For example, the centralized scheduling system 102 may receive an indication from a device of the first driver and/or of a vehicle being operated by the first driver. In some instances, the indication may be associated with a status of the first load being delivered, such as an amount of time until the first load is delivered, a location of the first load, a progress of the first load being delivered, and so forth.

At 408, the process 400 may determine whether the first driver is able to deliver the second load. For example, based at least in part on the first indication and information contained therein, the centralized scheduling system 102 may determine whether the first driver is able to deliver the second load. In some instances, whether the first driver is able to deliver the second load may be based on whether the first driver is able to deliver the second load on time, or as scheduled. For example, the first indication received at 406 may indicate that the first driver is three hours late delivering the first load and based on this indication, at 408, the process 400 may determine that the first driver will be unable to deliver the second load on time. Alternatively, at 408 the process 400 may determine that the first driver will deliver the first load on time and may therefore be able to pick up the second load on time. At 408, the process 800 may also determine whether or not the first driver is able to deliver the second load, for example, based on break-downs, maintenance issues, weather, traffic, and so forth.

If at 408, the process 400 determines that the first driver is able to deliver the second load, the process 400 may follow the "YES" route to 402 and assign the second load to the first driver or keep the second load assigned to the first driver.

Alternatively, if at 408 the process 400 determines that the first driver is unable to deliver the second load, the process 400 may proceed to 410. For example, the process 400 may monitor in-transit disruptions where the disruptions might lead to late arrival of loads or failed customer promises.

At 410, the process 400 may determine a second driver available to deliver the second load. For example, the centralized scheduling system 102 may determine a second driver that is available and compatible to deliver the second load. For example, using the process 300 described above, a second driver capable of delivering the second load may be determined given the availability (e.g., remaining HoS) of the second driver. In some instances, the centralized scheduling system 102 may determine the second driver based on the second driver being within a given distance of a pickup site of the second load, time, and/or driver preferences.

At 412, the process 400 may transmit a second indication of the second load to the second driver and/or a carrier associated with the second driver. For example, the centralized scheduling system 102 may transmit an indication of the second load to a device of the second driver and/or a device of a dispatcher associated with the second driver.

At 414, the process 400 may receive a third indication that the second load is accepted for (or by) the second driver. For example, the centralized scheduling system 102 may receive an indication that the second driver or the dispatcher associated with the second driver accepted the second load.

At 416, the process 400 may reassign the second load to the second driver. For example, the centralized scheduling system 102 may reassign the second load from the first driver to the second driver. In some instances, reassigning the second load may involve updating a schedule of the first driver and updating a schedule of the second driver to remove and add the second load, respectively. Additionally, in some instances, if the second load is reassigned to the second driver, a performance rating of the first driver may be reduced. The performance ratings may be utilized in future instances when recommending and/or assigning loads to drivers. For example, if a driver has a low performance rating, or below a certain threshold, the centralized scheduling system 102 may avoid recommending or assigning the load.

At 418, the process 400 may update a schedule and an availability of the first driver and a schedule and an availability of the second driver. For example, based on the second load being reassigned from the first driver to the second driver, the centralized scheduling system 102 may determine an updated schedule and an updated availability (e.g., HoS) of the first driver. That is, because the second load is no longer assigned to the first driver, the first driver may have an updated availability to accept alternate and/or additional loads. Likewise, based on the second load being assigned to the second driver, the centralized scheduling system 102 may update the schedule of the second driver to reflect the second load and may update the availability of the second driver based on the second load being assigned to the second driver. For example, the updated availability of the second driver may be utilized to determine whether the second driver is capable of accepting additional loads, or certain additional loads that are compatible with the availability of the second driver.

Accordingly, the process 400 may represent a scenario that uses disruption information and recommends reassignment of drivers to respond to in-transit issues while prioritizing driver compliance. Furthermore, although the process 400 illustrates reassigning the second load, a similar process may be used to determine that the first driver is set to deliver the first load early. Upon making this determination, the centralized scheduling system 102 may determine additional loads that are capable of being accepted by the first driver before delivering (or picking up) the second load. The additional loads may therefore occupy a time after delivering the first load but before picking up the second load. In some instances, rather than scheduling additional loads, the centralized scheduling system 102 may schedule breaks, meetings, trainings, periods of leave (e.g., vacation, sick days, personal time off, etc.) and so forth for the first driver.

Figure 5:
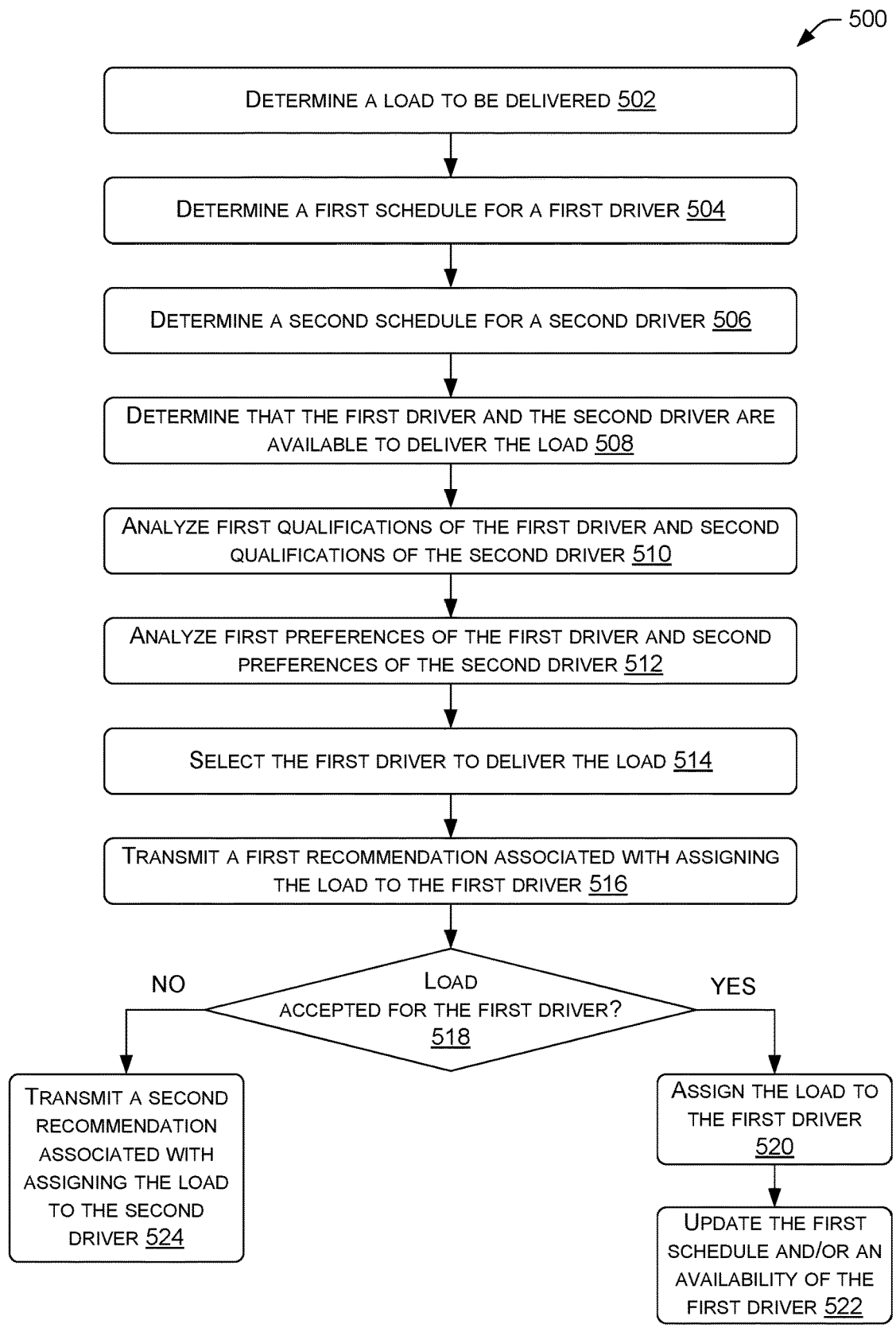
FIG. 5 illustrates an example process for selecting a driver to deliver a load, according to an embodiment of the present disclosure.

FIG. 5 illustrates an example process 500 for assigning loads to a driver. In some instances, the process 500 may be performed by the centralized scheduling system 102.

At 502, the process 500 may determine a load to be delivered. For example, the centralized scheduling system 102 may receive an indication that the load is fulfilled or readied for shipment, and thereafter, may determine that the load is to be delivered to a destination. By way of example, the load to be delivered may be from San Jose, Calif. to Seattle, Wash. and scheduled for pick up on Nov. 12, 2019 and delivered by Nov. 14, 2019.

At 504, the process 500 may determine a first schedule for a first driver. For example, the centralized scheduling system 102 may determine a weekly, monthly, and/or daily schedule of the first driver, including available openings, a number of hours the first driver has open for accepting loads (e.g., HoS), and so forth.

At 506, the process 500 may determine a second schedule for a second driver. For example, the centralized scheduling system 102 may determine a weekly, monthly, and/or daily schedule of the second driver, including available openings, a number of hours the second driver has open for accepting loads (e.g., HoS), and so forth.

At 508, the process 500 may determine that the first driver and the second driver are available to deliver the load. For example, based on analyzing the first schedule of the first driver and the second schedule of the second driver, the centralized scheduling system 102 may determine that the first driver and the second driver are available to deliver the load. That is, the centralized scheduling system 102 may determine that the first driver and the second driver are available to pick up the load on Nov. 12, 2019 and deliver the load by Nov. 14, 2019

At 510, the process 500 may analyze first qualifications of the first driver and second qualifications of the second driver. For example, the centralized scheduling system 102 may analyze the first qualifications of the first driver and second qualifications of the second driver. In some instances, analyzing the first qualifications and the second qualifications may determine whether the first driver and/or the second driver are qualified or certified to deliver the load. That is, the qualifications may be used to determine if the drivers are activate, inactive, or suspended, as well as commercial driving license (CDL) endorsements (e.g., hazmat, hazardous materials, etc.), and certifications to understand what loads the driver is qualified to deliver.

At 512, the process 500 may analyze first preferences of the first driver and second preferences of the second driver. For example, the centralized scheduling system 102 may analyze the first preferences of the first driver and second preferences of the second driver. In some instances, analyzing the first preferences and/or the second preferences to determine whether the first driver and/or the second driver prefers to deliver loads from San Jose, Calif. to Seattle, Wash., whether the first driver and/or the second driver prefers to deliver on dates associated with Nov. 12, 2019 and/or Nov. 14, 2019.

At 514, the process 500 may select the first driver to deliver the load. For example, based at least in part on the centralized scheduling system 102 analyzing the first schedule, the second schedule, the first qualifications, the second qualifications, the first preferences, and/or the second preferences, the centralized scheduling system 102 may select the first driver for delivering the load. For example, the centralized scheduling system 102 may determine that the first driver is more qualified to deliver the load (e.g., higher rating, experience, etc.), prefers to travel on dates associated with delivering the load, and so forth. In some instances, the centralized scheduling system 102 may rank the first driver and the second driver (or other drivers) and select a highest ranked driver or a driver having a rating over a certain threshold. Ranking the first driver and the second driver (or other drivers) may also be based at least in part on the familiarity of the drivers with the route associated with the load. Additionally, or alternatively, loads may be assigned to drivers that have the most availability or the greatest number of HoS remaining to distribute th loads across the drivers.

At 516, the process 500 may transmit a first recommendation associated with assigning the load to the first driver. For example, the centralized scheduling system 102 may transmit an indication to a device of the first driver and/or a device of a dispatcher of the first driver.

At 518, the process 500 may determine whether the load is accepted for the first driver. For example, the centralized scheduling system 102 may determine whether an indication of the load being accepted is received from the device of the first driver and/or the device of the dispatcher. If at 518 the process 500 determines that the load is accepted, the process 500 may follow the "YES" route and proceed to 520.

At 520, the process 500 may assign the load to the first driver. For example, the centralized scheduling system 102 may assign the load to the first driver.

At 522, the process 500 may update the first schedule of the first driver and/or an availability of the first driver. For example, by assigning the load to the first driver may include the centralized scheduling system 102 updating the first schedule to indicate the load. Additionally, based on the first driver accepting the load, the centralized scheduling system 102 may determine an updated availability (e.g., HoS) for the first driver to accept other loads.

Alternatively, if at 518 the process 500 determines that the load is not accepted by the first driver, the process 500 may follow the "NO" route and proceed to 524. At 524, the process 500 may transmit a second recommendation associated with assigning the load to the second driver. For example, the centralized scheduling system 102 may transmit an indication to a device of the second driver and/or a device of the dispatcher of the second driver associated with accepting the load.

Figure 6:
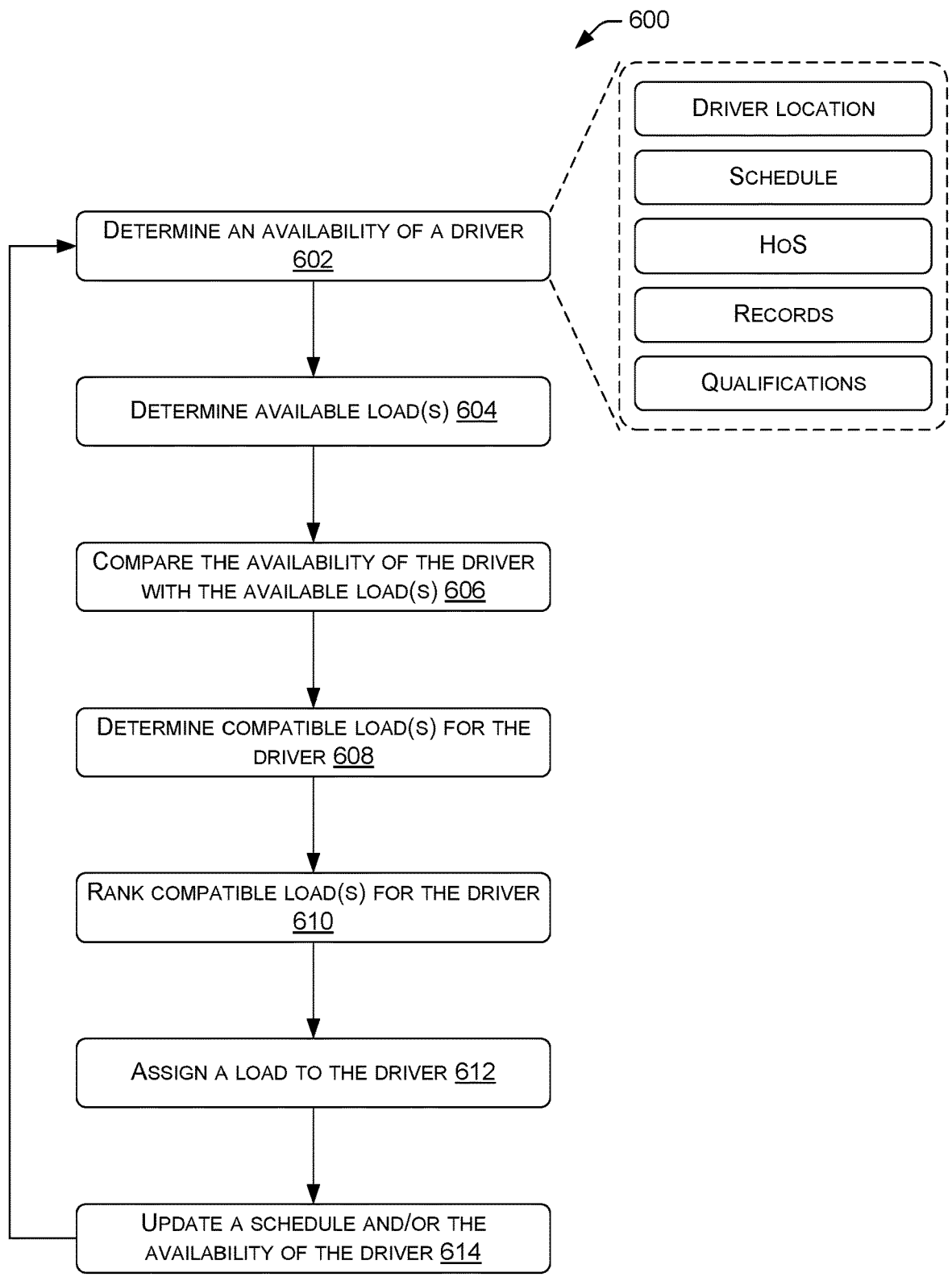
FIG. 6 illustrates an example process for determining a recommended load for a driver, according to an embodiment of the present disclosure.

FIG. 6 illustrates an example process 600 for determining loads for a driver and assigning loads to the driver. In some instances, the process 600 may be performed by the centralized scheduling system 102.

At 602, the process 600 may determine an availability of a driver. For example, the centralized scheduling system 102 may determine the availability of the driver to handle or accept loads based at least in part on a location of the driver, a schedule of the driver, preferences of the driver, HoS of the driver, a record of the driver, and/or qualifications of the driver. In some instances, the availability of the driver may represent, or correspond to, an availability to accept or be assigned certain loads based on the characteristics of the loads (e.g., duration, times, location, type, etc.).

At 604, the process 600 may determine available load(s). For example, the centralized scheduling system 102 may determine loads on a load board, or other forum, for assignment to drivers. In some instances, the loads on the load board may represent loads for reassignment to drivers and/or loads that are newly posted after orders are fulfilled and loads are created.

At 606, the process 600 may compare the availability of the driver with the available load(s). For example, the centralized scheduling system 102 may compare one or more criteria of the available load(s) (e.g., destination, origin, time, load type, etc.) with the availability of the driver (e.g., day, week, times, etc.). In some instances, comparing the availability of the driver with the available load(s) may match load(s) with the driver. In other words, the comparison may filter available loads to match a subset of the available loads with the driver as the driver may not be available (e.g., time, HoS permitted by federal regulations, etc.) to accept the available load(s).

At 608, the process 600 may determine compatible loads for the driver. For example, the centralized scheduling system 102, based at least in part on the comparison of the available loads with the availability of the driver, may determine the compatible loads.

At 610, the process 600 may rank the compatible load(s). For example, the centralized scheduling system 102 may rank the compatible load(s) based on one or more criteria, such as preferences of the driver. The ranking of the compatible loads may determine the most suitable loads for the driver. For example, although the driver may be available for a delivering a certain load, the origin and/or destination of the load may not be along a preferred route of the driver and/or times preferred by the driver. In some instances, the centralized scheduling system 102 may rank a predetermined number of the available loads. For example, the centralized scheduling system 102 may rank or determine the top five or a threshold number of available loads.

At 612, the process 600 may assign a load to the driver. For example, the centralized scheduling system 102 may select and assign the load to the driver. In some instances, as the centralized scheduling system 102 has access to the schedule of the driver, the preferences of the driver, and/or the qualifications of the driver, for example, the centralized scheduling system 102 may automatically assign load(s) to the driver. That is, in some instances, the centralized scheduling system 102 may automatically assign the loads to the drivers without the need for the driver and/or a dispatcher of the driver to confirm and/or accept the load.

The automatic assignment of the load to the driver may reduce an amount of communication between the centralized scheduling system 102, or an operator thereof, and the carrier (e.g., a carrier dispatch system 202). For example, rather than the centralized scheduling system 102 recommending a load and the carrier having to manually or check the assignment and availability of the load, the process 600 may confirm and automatically assign loads to the driver, thereby efficiently and conveniently scheduling loads to the drivers. The automatic assignment of loads to the drivers may also reduce an amount of communication across networks to confirm and/or accept driver and/or load assignments. Additionally, automatically assigning the loads, or centralizing the processing to determine load assignments may allow for faster processing. That is, as the centralized scheduling system 102 stores or otherwise maintains information to determine driver schedules, as well as match loads to drivers (or vice versa), the amount of time to compute, determine, and/or analyze the schedules to match drivers and loads may be reduced.

Conventionally, this process is time consuming given the storage of information across multiple databases. Additionally, conventional processes lack scalability and timely determining schedules, loads, and drivers across carriers. Accordingly, the centralized scheduling system 102 may determine, in parallel, across different carriers and based on specific carrier and/or driver criteria, loads for automatic assignment.

At 614, the process 600 may update the schedule and/or the availability of the driver. For example, after assigning the load to the driver, the centralized scheduling system 102 may update the schedule of the driver to reflect the load. Additionally, updating the availability may be based at least in part on characteristics of the load assigned to the driver, such as a remaining HoS the driver is capable of driving. Updating the availability may therefore be utilized for determining whether the driver has the capacity or is permitted to accept additional loads. This updated availability, as well as the schedule, may be utilized by the recommendation component 130 when determining recommended loads for the driver.

From 614, the process 600 may loop to 602 whereby the process 600 may repeat for determining additional available loads and assigning the additional available load(s) to the driver. For example, after updating the availability, the centralized scheduling system 102 may determine available loads for the driver.

Figure 7:
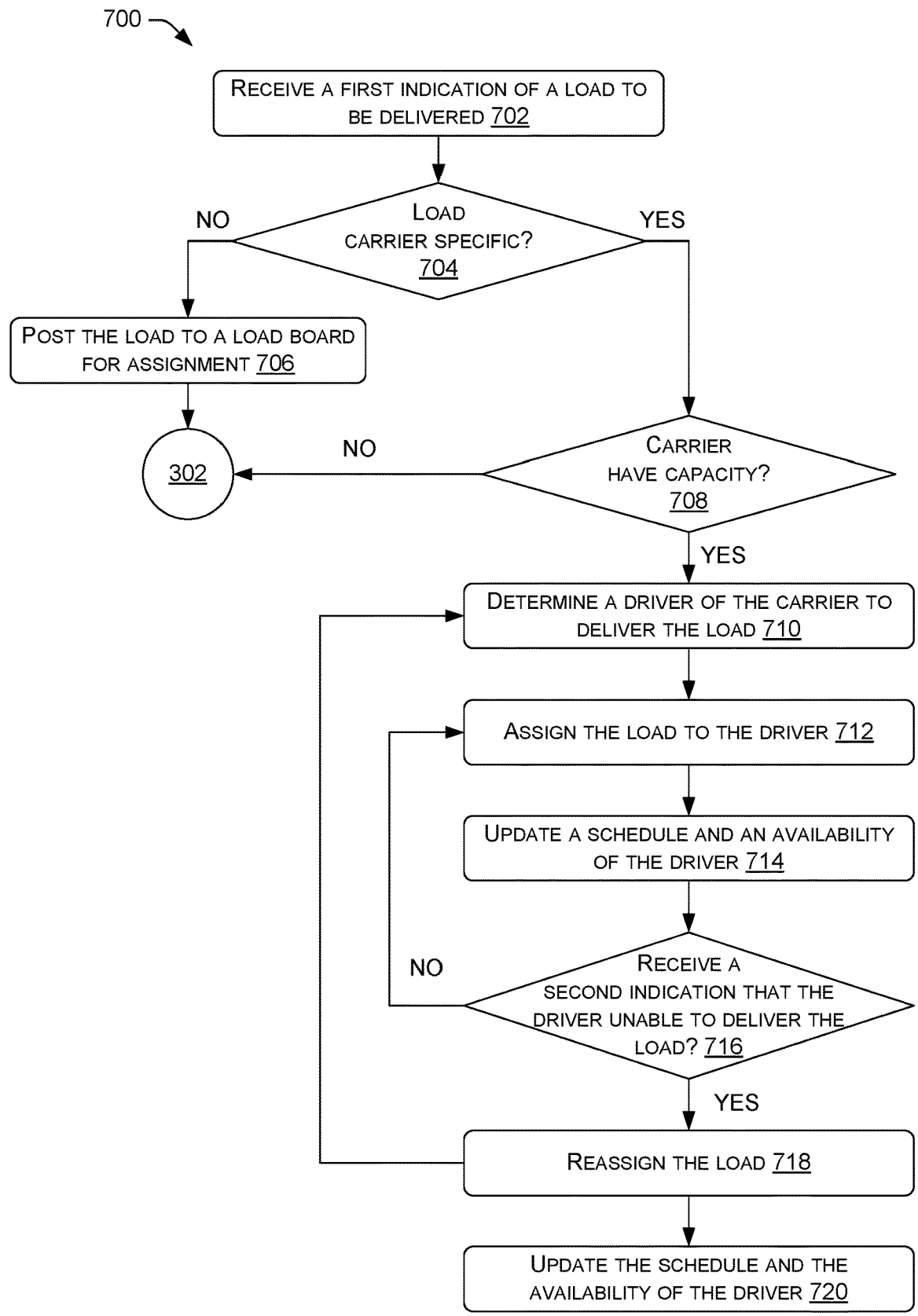
FIG. 7 illustrates an example process for assigning loads based on characteristics of the load, according to an embodiment of the present disclosure.

FIG. 7 illustrates an example process 700 for assigning loads based on a load type. In some instances, the process 700 may be performed by the centralized scheduling system 102.

At 702, the process 700 may receive a first indication of a load to be delivered. For example, the centralized scheduling system 102 may receive a first indication of the load to be delivered.

At 704, the process 700 may determine whether the load is a carrier-specific load. For example, certain loads may be assigned to particular carriers contracted or scheduled to handle routine or pre-planned loads. Here, whether the load is carrier-specific may impact which carrier the load is assigned to and/or how the load is assigned. For example, upon receiving the first indication of the load to be delivered, the centralized scheduling system 102 may determine whether the load is to be assigned to a particular carrier based on a delivery route of the load, the contents of the load, a size, weight, or volume of the load, and so forth.

If at 704, the process 700 determines that the load is not a carrier-specific load, the process 700 may follow the "NO" route and proceed to 706.

At 706, the process 700 may post the load to a load board. For example, the centralized scheduling system 102 may post or upload an indication of the load to the load board for assigning to a driver. From 706, the process 700 may proceed to 302 of the process 300 as described above in FIG. 3 to determine a compatible driver for delivering the load.

Alternatively, if at 704 the process 700 determines that the load is a carrier-specific load, the process 700 may follow the "YES" route and proceed to 708. At 708, the process 700 may determine whether the carrier has capacity (or availability) to accept the load. For example, the centralized scheduling system 102 may compare an availability of the carrier, or drivers of the carrier, to the pickup date and/or delivery date of the load. At 708, if the process 700 determines that the carrier (or the drivers of the carrier) does not have capacity to accept the load, the process 700 may follow the "NO" route and proceed to 302.

Alternatively, if at 708 the process 700 determines that the carrier has the capacity to accept the load, the process 700 may proceed to 710. At 710, the process 700 may determine a driver of the carrier to deliver the load. For example, the centralized scheduling system 102 may select a driver of the carrier (e.g., via the schedule of the driver, qualifications of the driver, etc.).

At 712, the process 700 may assign the load to the driver. For example, the centralized scheduling system 102, based on determining the driver that is available to deliver the load, may assign the load to the driver.

At 714, the process 700 may update a schedule of the driver. For example, based at least in part on the load being assigned to the driver, the centralized scheduling system 102 may update the schedule to reflect the load and may determine an availability (e.g., HoS, location, etc.) of the driver to accept additional loads.

At 716, the process 700 may determine whether a second indication is received that the driver is unable to deliver the load. For example, the centralized scheduling system 102 may determine that the driver is unable to pick up the load on time, the driver has declined acceptance of the load, the driver updates his or her schedule, and so forth. If at 716 the process 700 does not receive the second indication, the process 700 may follow the "NO" route and proceed to 712 to keep the load assigned to the driver.

Alternatively, if at 716 the second indication is received, the process 700 may follow the "YES" route and proceed to 718.

At 718, the process may reassign the load. For example, the centralized scheduling system 102 may determine that based on receiving the second indication that the driver is unable to deliver the load. From 718, the process 700 may loop to 710 to determine another driver of the carrier available to deliver the load. In some instances, however, from 718 the process 700 may continue to 302 if the carrier does not have remaining drivers available to accept the load. After determining a compatible driver, the process 700 may transmit an indication to the driver indicating that the load has been reassigned. For example, the centralized scheduling system 102 may notify the driver that the load has been reassigned or has been removed from the schedule of the driver.

At 720, the process 700 may update the schedule and the availability of the driver. For example, based on the load no longer being assigned to the driver, the centralized scheduling system 102 may remove the load from the schedule of the driver and determine the availability of the driver to accept other loads. That is, as the load is no longer assigned to the driver, the driver may be available to accept other loads for assignment.

Figure 8:
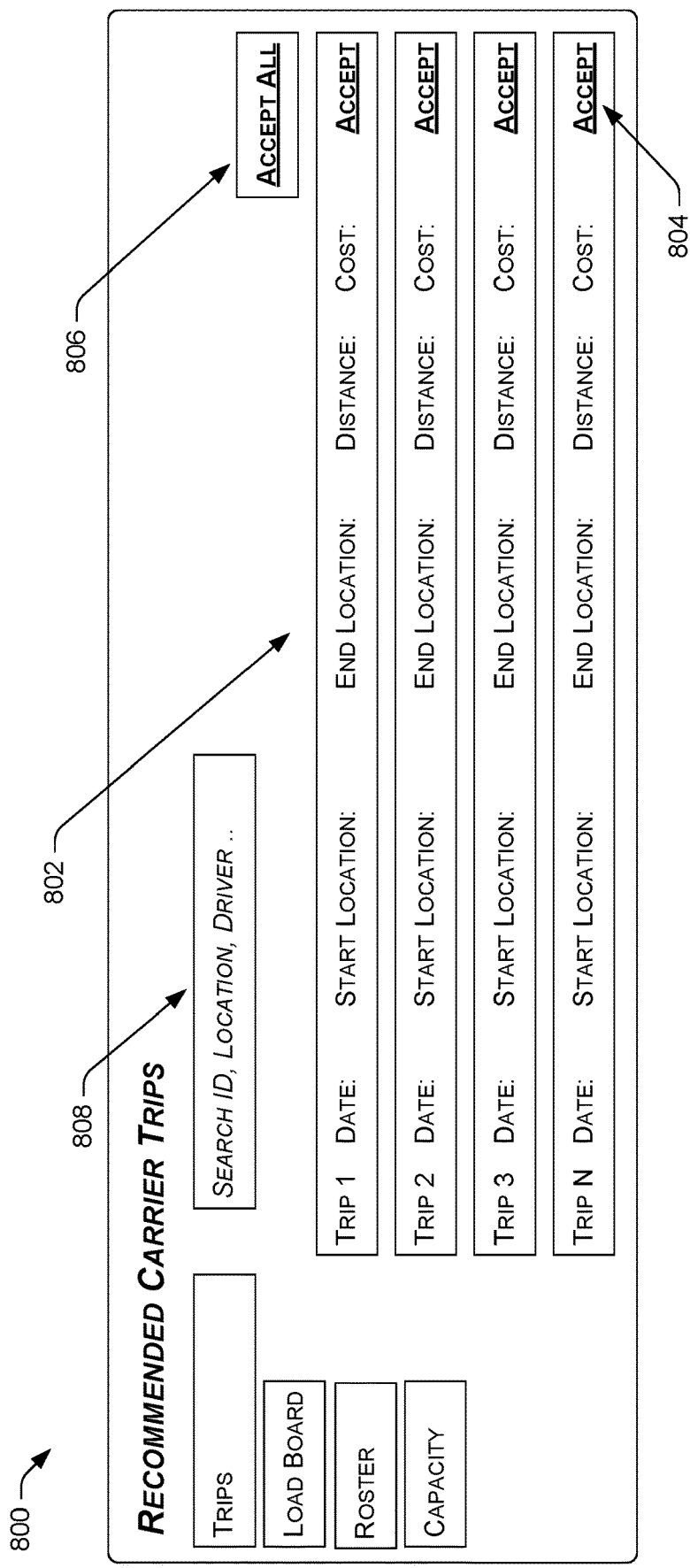
FIG. 8 illustrates an example user interface for recommended loads, according to an embodiment of the present disclosure.

FIG. 8 illustrates an example user interface 800 for providing recommended loads or trips. In some instances, the user interface 800 may be presented on a computing device of the carrier, computing device of a dispatcher of the carrier, and/or a device of a driver. In some instances, the centralized scheduling system 102 may cause the user interface 800 to be presented.

The user interface 800 is shown presenting recommended trips 802 for the carrier or for drivers of the carrier. For example, after the centralized scheduling system 102 determines the schedules of the drivers and/or a compatibility (e.g., preferences, qualifications, etc.) of the drivers to accept the loads, the centralized scheduling system 102 may transmit the recommended trips to the device. As shown, each of the recommended trips may include a date of the trip, a start location (e.g., origin), an end location (e.g., destination), a distance, and/or a cost (e.g., how much the carrier earns for delivering the load). Additional characteristics may also be presented (e.g., truck type).

The carrier, dispatcher, and/or driver may choose to individually accept the recommend trips by clicking, touching, or providing input to an accept icon 804 associated with the trip. In some instances, accepting the trip may populate a schedule of a driver of the carrier and/or the carrier may select a driver to assign the load.

In some instances, if the carrier accepts the trip, the carrier may be presented a user interface whereby the carrier may see driver recommendations for the trip and/or drivers that are available for the trip.

Additionally, as shown, the carrier may accept all of the recommended trips via an icon 806. In some instances, the user interface 800 may present any number of recommended trips.

Furthermore, the user interface 800 may present a field 808 that allows the carrier, dispatcher, and/or driver to search by recommended trips, driver, locations, and so forth.

In some instances, the carrier may have a certain amount of time to accept the trips before the loads are available to other drivers. For example, if the carrier does not accept the trip within a predetermined amount of time, the centralized scheduling system 102 may transmit the trip as a recommend load to another carrier.

Figure 9:
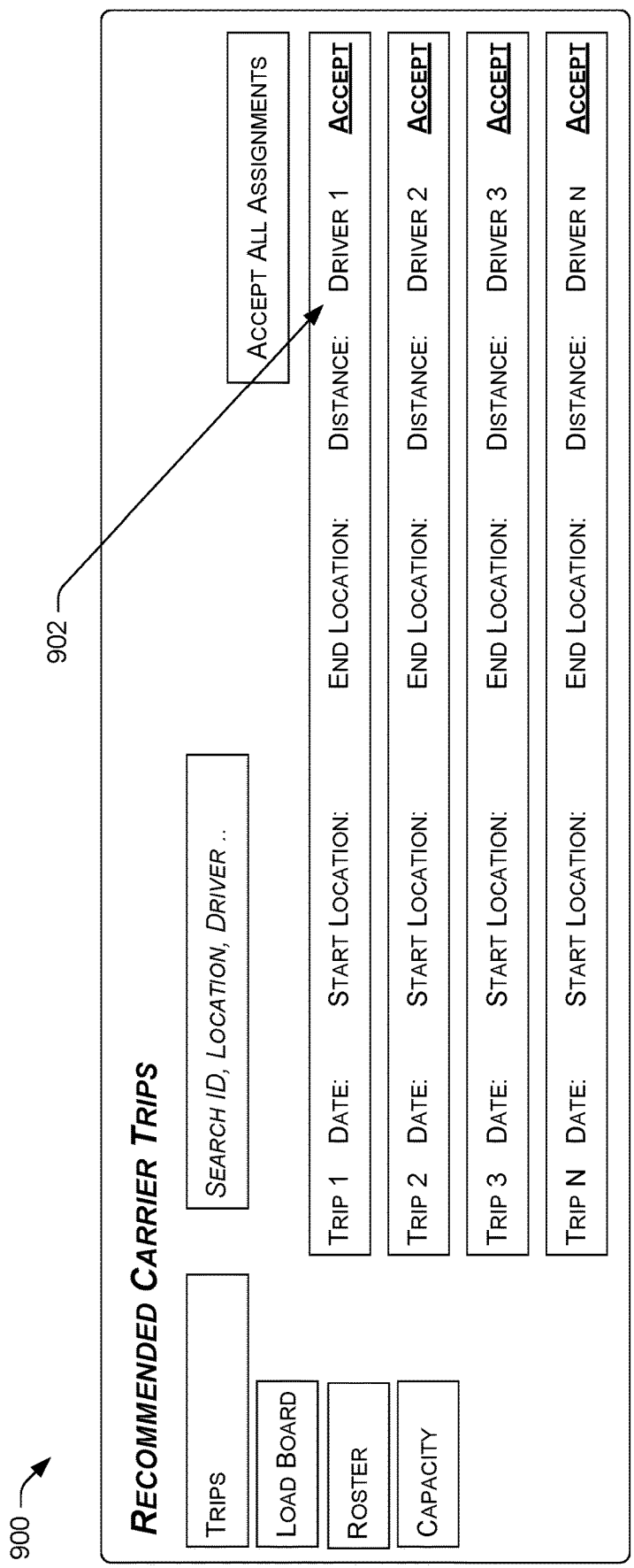
FIG. 9 illustrates an example user interface for recommending loads to drivers, according to an embodiment of the present disclosure.

FIG. 9 illustrates an example user interface 900 for providing recommended loads or trips, as well as recommended drivers. In some instances, the user interface 900 may be presented on a computing device of a carrier, a computing device of a dispatcher of the carrier, and/or a computing device of a driver. In some instances, the centralized scheduling system 102 may cause the user interface 900 to be presented.

As shown, the user interface 900 may include similar components or fields as the user interface 800. However, as shown in FIG. 9, the user interface 900 may present recommended drivers 902 for the recommended trips. That is, in analyzing the schedules of the drivers for the carrier and/or recommending trips, the centralized scheduling system 102 may also determine drivers available (e.g., schedule) and capable (e.g., preferences, qualifications, record, etc.) to deliver the loads. The drivers assigned to the trip may represent a highest-ranked driver among the other available drivers (if any). Additionally, the recommended trips and/or drivers may ensure that the carrier has drivers or that drivers of the carrier are compliant for the trip. This may, for example, prevent de-activated, non-compliant drivers from being assigned to a trip and. As carriers are subject to compliance and performance risks due to the inability to optimize trips, resulting in late loads, inefficient trips, and driver compliance concerns, the automatic assignment may reduce and/or potentially eliminate non-compliant and/or non-qualified drivers being assigned certain loads. That is, as shown in FIG. 9, drivers may be assigned to the trips based on an eligibility criteria of the driver. Such process may automate scheduling and work assignment decision to improve an operational efficiency of the carrier.

In some instances, the carrier, dispatcher, or driver may accept all assignments and/or may individually accept the assignments. Upon accepting the recommended trips, the schedules of the drivers may be updated and populated to reflect the acceptance of the trip and the dates, times, and schedule for delivery. For example, upon a trip being recommended and accepted, the centralized scheduling system 102 may automatically update capacity of the driver.

Figure 10:
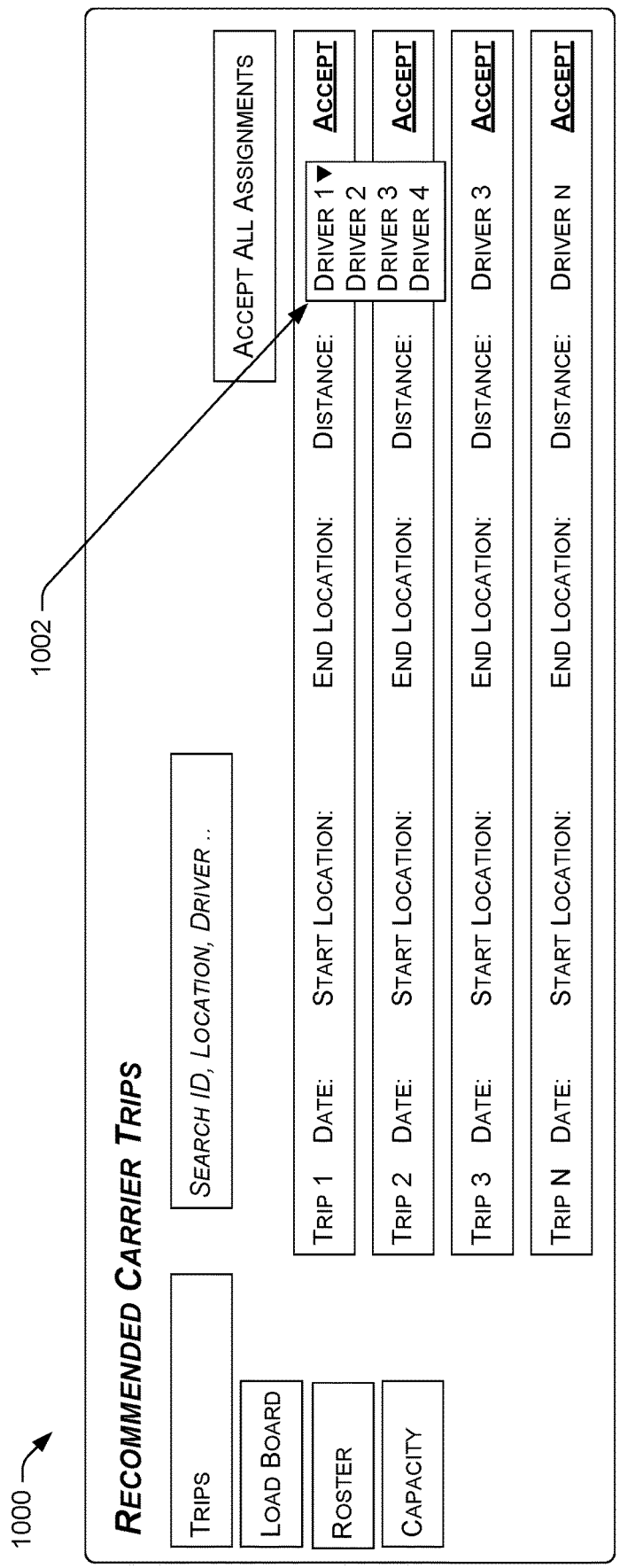
FIG. 10 illustrates an example user interface for selecting drivers for available loads, according to an embodiment of the present disclosure.

FIG. 10 illustrates an example user interface 1000 for providing recommended trips, driver recommendations, as well as the ability to change the driver for the trips. In some instances, the user interface 1000 may be presented on a computing device of a carrier, a computing device of a dispatcher of the carrier, and/or a computing device of a driver. In some instances, the centralized scheduling system 102 may cause the user interface 1000 to be presented.

As shown, the user interface 1000 may include similar components or fields as the user interface 800 and/or the user interface 900. However, as shown in FIG. 10, the user interface 1000 may provide the carrier or dispatcher with the ability to modify a recommended driver. For example, compared to FIG. 9 whereby the centralized scheduling system 102 may automatically assign a driver to the recommended trip, FIG. 10 illustrates a drop-down menu 1002 where the carrier may select among other available drivers for assigning the recommended trip. In some instances, the carrier may scroll over an icon for opening the drop-down menu 1002 to view the other drivers available and capable of handling the recommended trip. Here, the carrier may choose to keep the assignment or select among the other available drivers.

In some instances, the drop-down menu 1002 may be populated with a predetermined number of drivers and/or the drives may be presented in a descending rank. For example, driver 1 may be the most-compatible driver for the recommended trip as compared to the driver 4, which may be the least-compatible driver for the recommended trip. Additionally, or alternatively, the drivers may be ranked based on their familiarity with a route (start location and end location) of the trip and/or the driver having the most availability (e.g., the most HoS remaining). In some instances, all drivers within the drop-down menu 1000 may be available and have the capacity to accept the recommended trip. That is, the drivers may meet minimum compliance requirements for the load. However, certain drivers may be ranked higher than other drivers, or may be recommended for the trip, based on preferences of the drivers, previously-delivered trips (e.g., vicinity to start location of the trip), ratings, experience, and so forth.

Figure 11:
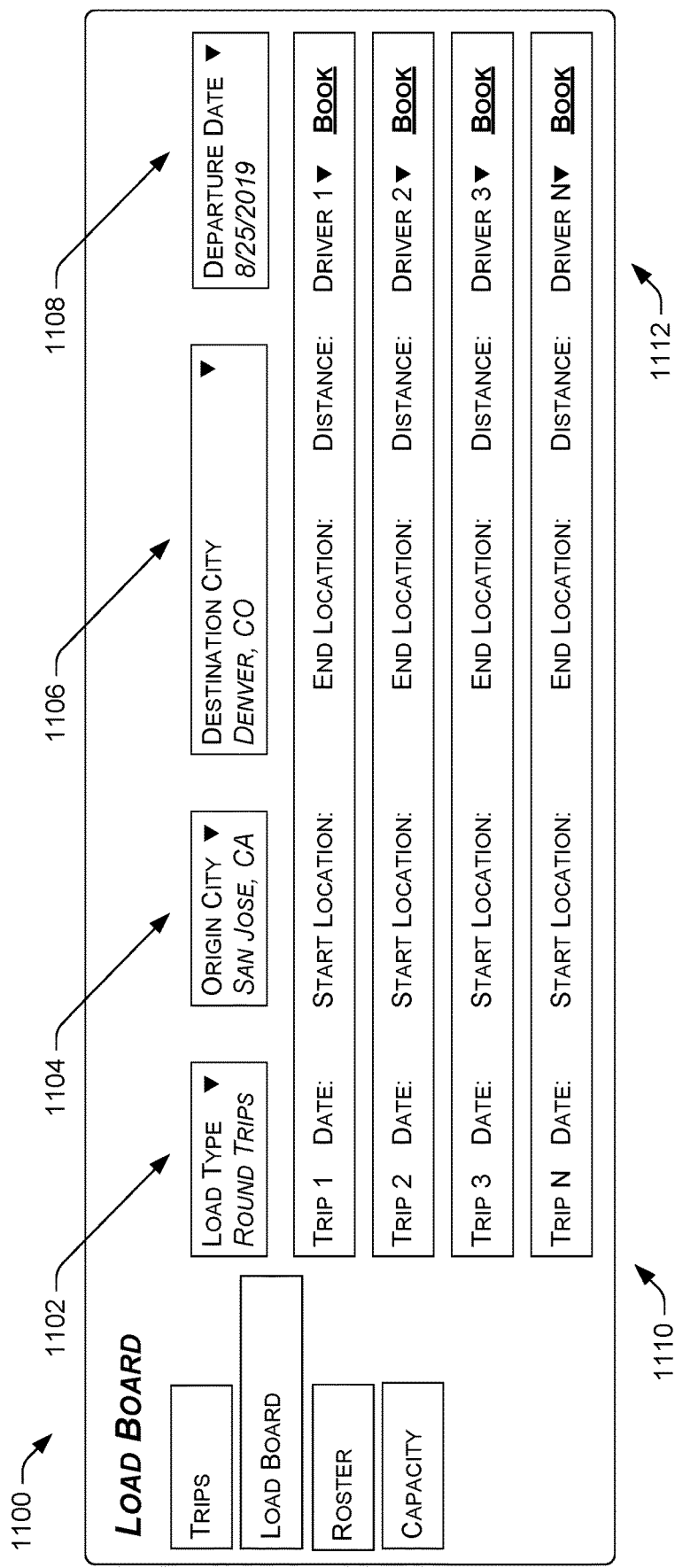
FIG. 11 illustrates an example user interface for presenting available loads, according to an embodiment of the present disclosure.

FIG. 11 illustrates an example user interface 1100 for presenting loads within a load board. In some instances, the user interface 1100 may be presented on a computing device of a carrier, a computing device of a dispatcher of the carrier, and/or a computing device of a driver. In some instances, the centralized scheduling system 102 may cause the user interface 1100 to be presented.

The user interface 1100 illustrates a load board showing available loads. The dispatcher, for example, may track the load board in real-time for loads that may be undertaken based on a current availability and/or capacity of the driver, preferences for price, distance, timing etc. In some instances, the user interface 1100 may present fields and/or drop-down menus whereby the carrier may filter or refine loads in the load board. For example, the user interface 1100 may present a field 1102 whereby the carrier may select among load types (e.g., round-trip, one-way, multiple destination, etc.), a field 1104 whereby the carrier may select or enter an origin city, a field 1106 whereby the carrier may select or enter a destination city, and/or a field 1108 whereby the carrier may select a departure date. However, the user interface 1100 may include additional fields to filter or select loads, such as delivery date of the load, budgets, vehicle type, etc. Regardless of the number or type of field, upon selecting entries within the fields, the user interface 1100 may present loads 1110 that match the entries as entered (e.g., via communication with the centralized scheduling system 102). As similarly discussed above with regard to FIGS. 8-10, the user interface 1100 may present the trips in association with their dates, start location, end location, and so forth.

Additionally, as shown, the user interface 1100 may include drivers 1112 available and capable to accept the loads. In some instances, the drivers 112 may be determined by the centralized scheduling system 102 as discussed above. Moreover, the carrier may be permitted to select among more than one driver for assigning the load.

The carrier may choose to individually book the loads or may book all loads. Regardless, if booked, the schedules of the drivers may be respectively updated and once accepted, the loads may be removed from the load board.

Figure 12:
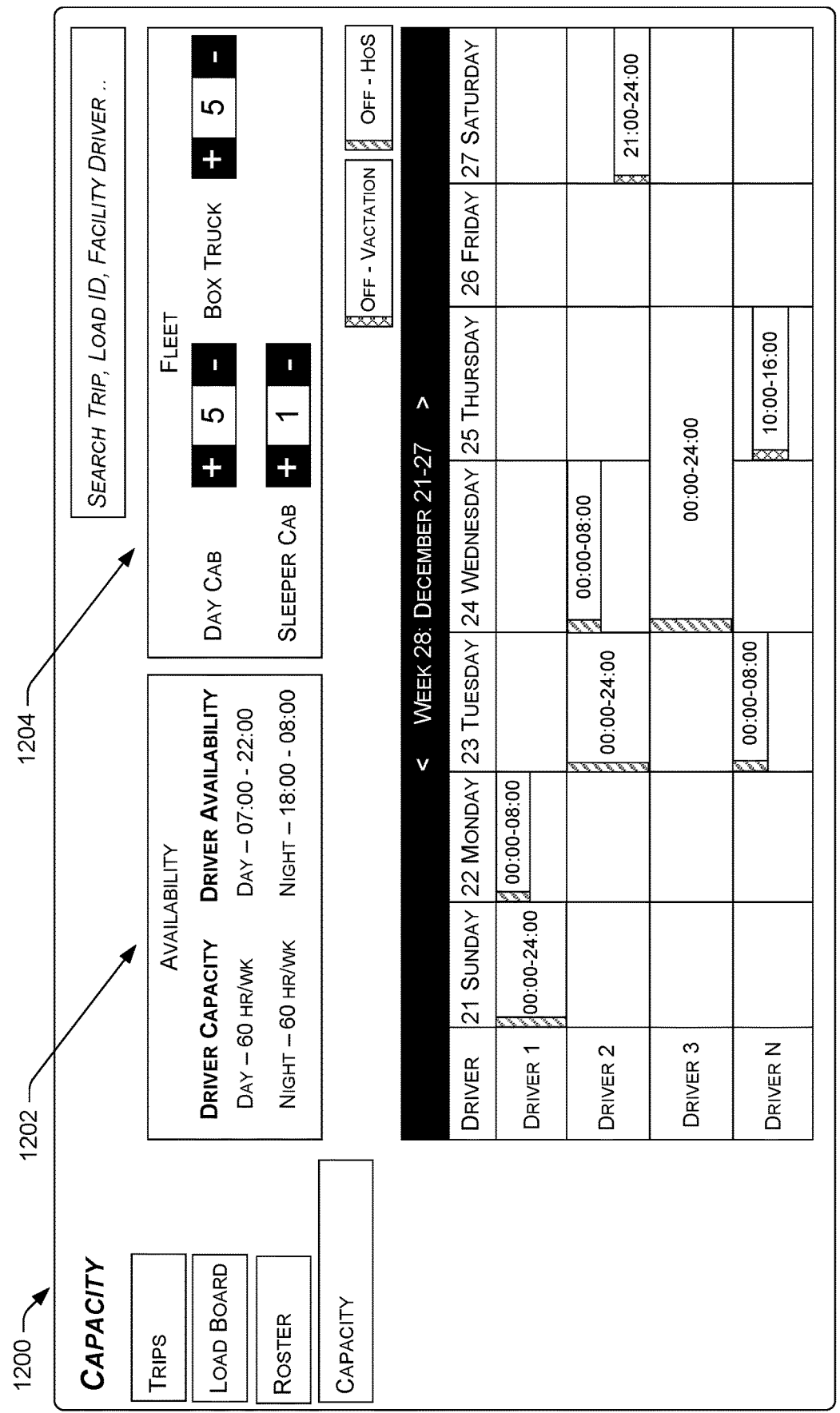
FIG. 12 illustrates an example user interface for presenting a schedule, according to an embodiment of the present disclosure.

FIG. 12 illustrates an example user interface 1200 for viewing schedules or a capacity of drivers. In some instances, the user interface 1200 may be presented on a computing device of a carrier, a computing device of a dispatcher of the carrier, and/or a computing device of a driver. In some instances, the centralized scheduling system 102 may cause the user interface 1200 to be presented.

As shown, the user interface 1200 may illustrate schedules for drivers of the carrier. The schedules may include a weekly view of the trips or loads assigned to the individual drivers, as well as the times associated therewith. In some instances, the user interface 1200 may permit the carrier or the dispatcher to view the capacity of the carrier for accepting additional loads. For example, the dispatcher may view the schedules of the driver when determining whether the carrier has additional capacity for accepting loads.

As loads are accepted and scheduled for the drivers, the user interface 1200 may update to provide a real-time illustration of a driver's eligibility to perform work. Furthermore, the schedules of the driver may also indicate breaks, lunches, trainings, additional yard work (e.g., tasks within a yard of the carrier and/or retailer), and so forth.

The carrier may select and/or click on a certain driver and/or day to receive a detailed view of the schedules of the drivers. For example, the user interface 1200 shows that that driver 1 has a trip planned for Sunday, December 21. The carrier may select trip to obtain information about the trip (e.g., originating location, destination, etc.). Furthermore, the carrier may scroll through weeks and/or months, as presented on the calendar, to view upcoming schedules of the driver(s).

The carrier may interact with the user interface 1200 for updating schedules of the user, such as entering in vacation time and/or scheduling trips. Additionally, the user interface 1200 is shown including a first field 1202 in which the carrier may update the driver capacity and/or the driver availability for accepting additional loads. For example, the dispatcher may update the driver availability depending on driver preferences, dates, and/or times the drivers are not scheduled for loads. Additionally, the dispatcher may alter the driver capacity, for example, based on the qualifications and/or HoS permitted. After updating the first field 1202, the device presenting the user interface 1200 may transmit the availability to the centralized scheduling system 102 for use in determining loads.

Additionally, the user interface 1200 is shown including a second field 1204 in which the dispatcher may update a number of day cabs, box trucks, and/or sleeper cabs available. For example, the carrier may include fleet of vehicles having different characteristics (e.g., day cab, sleeper cab, long-bed, boxed-trailer, etc.). The characteristics of the fleet may be utilized to when assigning loads. For example, a load on the load board may be from Florida to California, a trip that may require a sleeper cab. When selecting and/or recommending loads, the centralized scheduling system 102 may account for the fleet of the carrier or characteristics of the fleet. With the user interface 1200, the dispatcher may update fleet information for use by the centralized scheduling system 102 when selecting and assigning loads. However, the user interface 1200 may include additional fields for updating the availability and/or the capacity of the drivers. For example, the dispatcher may deactivate or suspend a driver and indicate the reasoning, which in turn, may impact the availability of the driver to be assigned loads.

Accordingly, the centralized scheduling system 102 allows dispatchers to build labor plans, work schedules, plan for lunch and breaks, and schedule non-driving responsibilities such as training, yard work (e.g., moving hostler trailers, moving trailers between bays, etc.), other non-driving responsibilities, and/or manager meetings. Additionally, the user interface 1200 may constantly update available driver capacity based on location, delays, work hours, miles driven, lunch-break timings, driver type, current schedule, and/or preferences, etc. for use in scheduling and assigning loads. The user interface 1200 may also allow dispatchers to manage driver assignments and operations across multiple carriers and workflows within a single platform. The centralized scheduling system 102 may therefore reduce a number of platforms a carrier interacts with to ensure on-time departure and arrival of loads, while mitigating disruptions or problems associated with trips and driver assignments.

Figure 13:
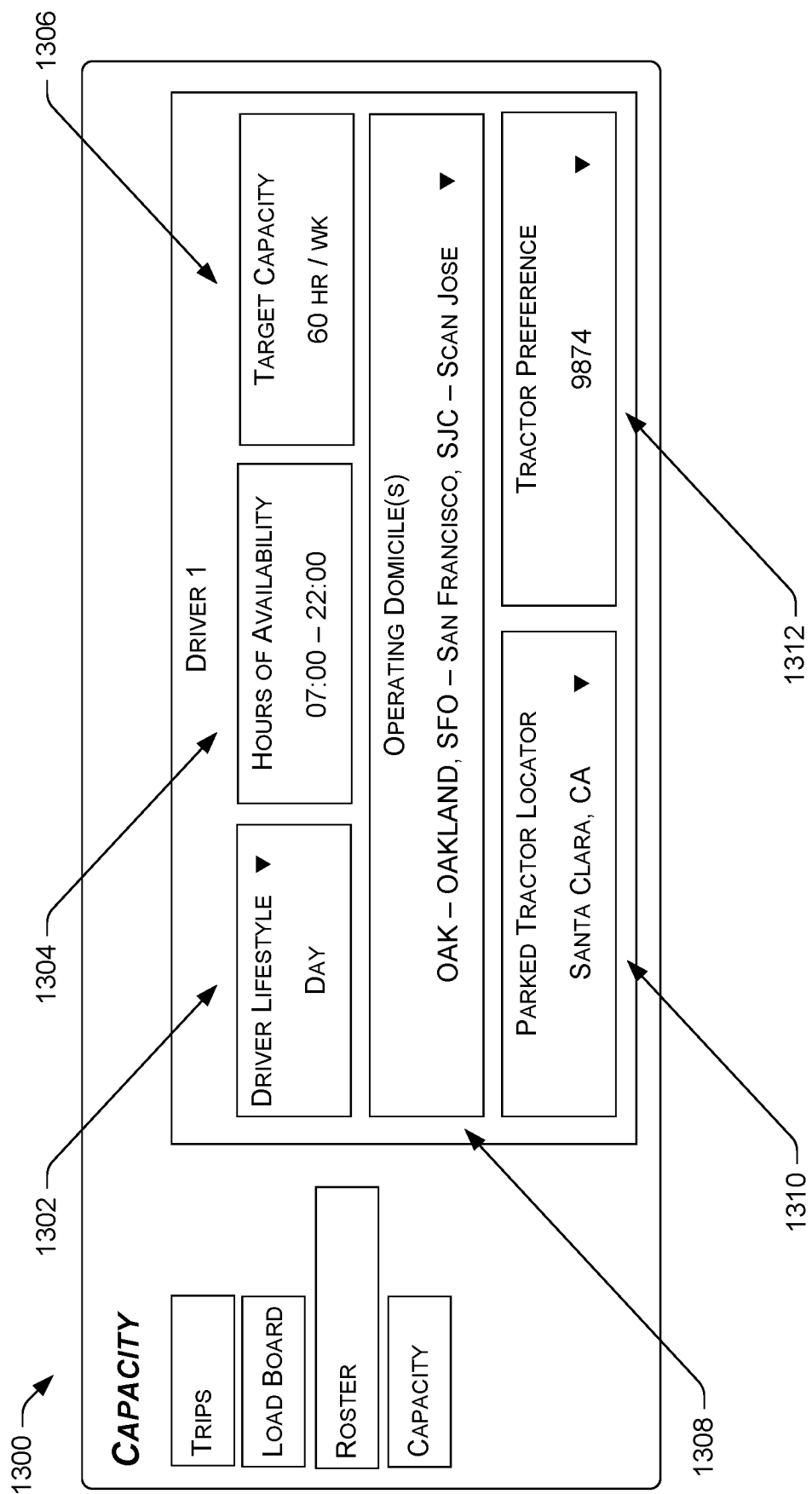
FIG. 13 illustrates an example user interface for updating a schedule, availability, and/or preferences of a driver, according to an embodiment of the present disclosure.

FIG. 13 illustrates an example user interface 1300 for updating preferences of a driver. In some instances, the user interface 1300 may be presented on a computing device of a carrier, a computing device of a dispatcher of the carrier, and/or a computing device of a driver. In some instances, the centralized scheduling system 102 may cause the user interface 1300 to be presented.

As discussed above, drivers may have preferences for trips and/or loads, such as originating locations, times of the week the driver prefers to deliver loads, and so forth. The user interface 1300 is shown including various fields in which the dispatcher (or potentially the driver) may interact to update preferences for loads. For example, the user interface 1300 may include a first field 1302 for a lifestyle (e.g., day, night, overnight, etc.), a second field 1304 for availability (e.g., hours of the day), a third field 1306 for a capacity to driver, a fourth field 1308 for operating domiciles (e.g., home-base, origin location, where the driver prefers to travel from, etc.), a fifth field 1310 for parked tractor locator (e.g., where the vehicle of the driver is located), and/or a sixth field 1312 for a preferred vehicle the driver prefers to drive (e.g., make, model, type, capabilities, etc.).

After updating and/or selecting the preferences, the device may store and/or transmit the preferences to the centralized scheduling system 102. For example, the centralized scheduling system 102 may store the preferences in association with the driver (e.g., the drivers 114 and the preferences 214). The preferences of the driver may be utilized when determining, selecting, and/or assigning loads to the drivers. For example, the centralized scheduling system 102 may recommend loads to the driver based on the preferences. In some instances, as the preferences are set or determined, dispatchers may see loads from the load board automatically populating along with driver assignments (e.g., as shown and discussed hereinabove).

Although the user interface 1300 is shown including certain preferences or fields modifiable by the dispatcher, the user interface may include additional and/or alternate fields and/or preferences (e.g., destination location, budget, contents of the load, etc.). Additionally, or alternatively, the user interface 1300 may include more than or less than the number of fields and/or preferences as shown.

While various examples and embodiments are described individually herein, the examples and embodiments may be combined, rearranged and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
   determining, among a plurality of loads, a first load to be delivered by a driver;
   determining characteristics of the first load, the characteristics comprising:
   a first date and a first time associated with the driver receiving the first load; and
   a second date and a second time associated with the driver delivering the first load;
   determining a break during a delivery of the first load by the driver based at least in part on the characteristics;
   generating a first schedule for the driver, the first schedule indicating a first period of time associated with delivering the first load and a second period of time associated the break;
   determining, based at least in part on the first schedule, available hours of service (HoS) of the driver;
   determining, among the plurality of loads and based at least in part on the first schedule and the available HoS, a second load to be delivered by the driver;
   generating a second schedule for the driver, the second schedule including the first period of time associated with delivering the first load, the second period of time associated with the break, and a third period of time associated with delivering the second load;
   transmitting a first indication of the second schedule to a first device of a dispatcher associated with a carrier of the driver, the first device being configured to display the second schedule;
   receiving, from the first device, a second indication associated with an acceptance of the first load and the second load;
   confirming, based at least in part on the second indication, an assignment of the first load and the second load to the driver;
   transmitting a third indication of the second schedule to a second device associated with the driver, the second device being configured to display the second schedule;
   receiving, from the second device, data generated by a location sensor of the second device, the data being indicative of a location of the driver during delivery of the first load;
   determining, based at least in part on the location, that the driver is able to deliver the first load on time; and
   refraining from reassigning the second load based at least in part on the driver being able to deliver the first load on time.

2. The method of claim 1, further comprising:
   determining, based at least in part on the second schedule, a training for the driver, wherein the training is compatible with the second schedule; and
   generating a third schedule including the training for the driver.

3. The method of claim 1, wherein the characteristics comprise first characteristics, further comprising:

receiving a fourth indication of a third load to be delivered by the driver, the fourth indication including second characteristics of the third load that comprise:
a third date and a third time associated with the driver receiving the third load; and
a fourth date and a fourth time associated with the driver delivering the third load;
determining, based at least in part on the second schedule and the second characteristics of the third load, that the driver is available to deliver the third load;
determining a third schedule of the driver, the third schedule including the first load, the break, the second load, and the third load; and
determining an availability of the driver to accept one or more fourth loads based at least in part on the third schedule.

4. The method of claim 3, further comprising determining, based at least in part on the second characteristics of the third load, that an additional break is not required during a delivery of the third load.

5. The method of claim 1, wherein the available HoS comprise first available HoS, further comprising:
determining, based at least in part on the first load and the second load, second available hours of service (HoS) of the driver; and
determining, based at least in part on the second available HoS, one or more third loads that are compatible with the second schedule of the driver and which the driver is capable of accepting.

6. The method of claim 1, wherein the driver comprises a first driver, further comprising:
determining a third load to be delivered by a second driver;
determining a third schedule of the second driver based at least in part on the third load; and
transmitting a fourth indication of the third schedule to the first device of the dispatcher, wherein the first device is configured to display the second schedule in unison with the third schedule.

7. The method of claim 1, further comprising:
determining, based at least in part on the second schedule, one or more break periods of the driver; and
automatically assigning a task to the driver, the task including at least one of a meeting, an additional load, or a rest.

8. The method of claim 1, further comprising:
receiving, from the second device, second data generated by the location sensor of the second device, the second data being indicative of a second location of the driver during delivery of the first load;
determining, based at least in part on the second location that the driver is unable to deliver the first load on time; and
rescheduling the second load from the driver to an additional driver based at least in part on the driver being unable to deliver the first load on time.

9. A method comprising:
storing a first schedule in association with a first driver;
determining a first load to be delivered by the first driver;
assigning the first load to the first driver based at least in part on at least one of a first availability of the first driver, one or more qualifications of the first driver, or one or more regulations associated with a carrier of the first driver;

determining a first break for the first driver during delivery of the first load, the first break being based at least in part on a duration of travel associated with the first load;
generating a second schedule to reflect the first load and the first break;
determining a second availability of the first driver based at least in part on the second schedule;
determining a second load to be delivered by the first driver;
assigning the second load to the first driver based at least in part on the second availability;
generating a third schedule to reflect the first load, the first break, and the second load;
receiving, from a device associated with the first driver, first location data generated by a location sensor of the device, the first location data being indicative of a first location of the first driver;
determining, based at least in part on the first location data, a first estimated time for the first driver to deliver the first load;
determining that the first estimated time is prior to a scheduled departure time of the second load;
receiving, from the device associated with the first driver, second location data generated by the location sensor of the device, the second location data being indicative of a second location of the first driver;
determining, based at least in part on the second location data, a second estimated time to deliver the first load;
determining that the second estimated time is after the scheduled departure time of the second load; and
reassigning the second load from the first driver to a second driver.

10. The method of claim 9, further comprising:
receiving, from at least one of a second device associated with a carrier or the device associated with the first driver, an indication associated with a third load to be delivered by the first driver;
generating a fourth schedule based at least in part on the third load; and
determining a third availability of the first driver based at least in part on the fourth schedule.

11. The method of claim 10, further comprising:
automatically determining a second break for the first driver during delivery of the third load, the second break being based at least in part on a second duration of travel associated with the third load; and
automatically scheduling the second break within the fourth schedule.

12. The method of claim 9, further comprising:
receiving, from at least one of a second device associated with a carrier of the first driver or the device associated with the first driver, an indication associated with cancelling the second load; and
generating a fourth schedule based at least in part on the second load being cancelled.

13. The method of claim 9, wherein the one or more qualifications comprise one or more first qualifications, further comprising:
receiving, from a second device associated with a carrier of the first driver and the second driver, a first indication indicating at least one of:
one or more first preferences of the first driver,
the one or more first qualifications of the first driver, or
one or more first vacations of the first driver;
receiving, from the second device, a second indication indicating at least one of:

one or more second preferences of the second driver,
one or more second qualifications of the second driver,
or
one or more second vacations of the second driver; and
generating at least one of:
a fourth schedule of the first driver based at least in part on receiving the first indication, or
a fifth schedule of the second driver based at least in part on receiving the second indication.

14. The method of claim 9, further comprising:
determining, based at least in part on the first schedule, first hours of service (HoS) during a first week of the first schedule;
determining a first availability of the first driver during the first week based at least in part on the first HoS;
generating the second schedule based at least in part on the first availability;
determining, based at least in part on the third schedule, second HoS during a second week of the second schedule;
determining a second availability of the second driver during the second week based at least in part on the second HoS; and
generating a fourth schedule of the second driver based at least in part on the second availability.

15. The method of claim 9, further comprising:
receiving a request associated with obtaining information associated with the first driver; and
automatically generating, based at least in part on receiving the request, a report that indicates:
the first load and the second load to be delivered by the first driver;
the one or more qualifications of the first driver;
training of the first driver; and
the third schedule of the first driver.

16. The method of claim 9, further comprising:
determining a third load to be delivered;
determining at least a third driver and a fourth driver that are available to deliver the third load;
determining a first ranking associated with the third driver delivering the third load;
determining a second ranking associated with the fourth driver delivering the third load;
determining that the first ranking is greater than the second ranking; and
transmitting a first indication of the third load to a second device associated with a dispatcher of the third driver and the fourth driver, the second device being configured to display, in conjunction with the first indication:
a second indication of the third driver as a recommended driver for the third load, and
a third indication of the fourth driver within a drop-down menu.

17. A system, comprising:
one or more processors; and
one or more non-transitory computer-readable media storing computer-executable instructions that, when executed by the one or more processors, cause the one or more processors to perform acts comprising:
storing a first schedule in association with a first driver,
determining a first load to be delivered by the first driver,
assigning the first load to the first driver based at least in part on at least one of a first availability of the first driver, one or more qualifications of the first driver, or one or more regulations associated with a carrier of the first driver,
determining a first break for the first driver during delivery of the first load, the first break being based at least in part on a duration of travel associated with the first load,
generating a second schedule to reflect the first load and the first break,
determining a second availability of the first driver based at least in part on the second schedule,
determining a second load to be delivered by the first driver,
assigning the second load to the first driver based at least in part on the second availability,
generating a third schedule to reflect the first load, the first break, and the second load,
receiving, during delivery of the first load and from a device associated with the first driver, location data generated by a sensor of the device, the location data being associated with a location of the first driver,
determining, based at least in part on the location, an estimated time for the first driver to deliver the first load,
determining that the estimated time is after a departure time of the second load, and
reassigning, in real-time and based at least in part on the estimated time being after the departure time, the second load from the first driver to a second driver.

18. The system of claim 17, the acts further comprising:
generating a fourth schedule for the first driver to reflect the first load and the first break;
generating a fifth schedule for the second driver to reflect the second load;
transmitting a first indication of the fourth schedule to the device of the first driver, the device being configured to display the fourth schedule; and
transmitting a second indication of the fifth schedule to a second device of the second driver, the second device being configured to display the fifth schedule.

19. The system of claim 17, the acts further comprising:
receiving, from the device associated with the first driver, second location data generated by the sensor of the device, the second location data being associated with a second location of the first driver;
determining, based at least in part on the second location, a second estimated time for the first driver to deliver the first load;
determining, based at least in part on the second estimated time, a task to be performed by the driver; and
generating a fourth schedule for the first driver to reflect the task.

20. The system of claim 17, the acts further comprising:
receiving, during delivery of a third load by the second driver, and from a second device associated with the second driver, second location data generated by a second sensor of the second device, the second location data being associated with a second location of the second driver;
determining, based at least in part on the second location, a second estimated time for the second driver to deliver the third load;
determining that the second estimated time is prior to the departure time of the second load; and
reassigning, in real-time and based at least in part on the estimated time being prior to the departure time, the third load from the first driver to the second driver.

* * * * *